US010911313B2

(12) United States Patent
Brooks et al.

(10) Patent No.: US 10,911,313 B2
(45) Date of Patent: Feb. 2, 2021

(54) METHODS AND APPARATUS FOR PREDICTIVE CAPACITY ALLOCATION

(71) Applicant: TIME WARNER CABLE ENTERPRISES LLC, New York, NY (US)

(72) Inventors: Paul D. Brooks, Weddington, NC (US); Remi Rieger, Austin, TX (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 88 days.

(21) Appl. No.: 15/213,132

(22) Filed: Jul. 18, 2016

(65) Prior Publication Data

US 2017/0019307 A1 Jan. 19, 2017

Related U.S. Application Data

(63) Continuation of application No. 11/800,093, filed on May 4, 2007, now Pat. No. 9,398,346.

(51) Int. Cl.
*H04L 12/24* (2006.01)
*H04N 7/167* (2011.01)
(Continued)

(52) U.S. Cl.
CPC ........ *H04L 41/0896* (2013.01); *H04L 41/147* (2013.01); *H04N 7/1675* (2013.01);
(Continued)

(58) Field of Classification Search
CPC .............. H04L 41/0896; H04L 41/147; H04N 21/2543; H04N 21/4181; H04N 21/47202;
(Continued)

(56) References Cited

U.S. PATENT DOCUMENTS

| 5,758,257 A | 5/1998 | Herz et al. |
| 5,844,552 A | 12/1998 | Gaughan et al. |

(Continued)

FOREIGN PATENT DOCUMENTS

| WO | WO-0027044 A2 | 5/2000 |
| WO | WO-0064174 A1 | 10/2000 |

(Continued)

OTHER PUBLICATIONS

MPEG Headers Quick Reference, http://dvd.sourceforge.net/dvdinfo/mpeghdrs.html, Mar. 6, 2006.

*Primary Examiner* — Omar S Parra
(74) *Attorney, Agent, or Firm* — Gazdzinski & Associates, PC

(57) ABSTRACT

Methods and apparatus for dynamically adjusting capacity allocation; e.g., to a group of services in a multimedia distribution network. In one embodiment, bandwidth allocation is adjusted by predicting bandwidth utilization of the group of services based on historical bandwidth utilization information. Behavioral templates and statistical models may also be employed for the predictions. The invention provides more efficient use of available bandwidth compared to conventional bandwidth allocation schemes where the overall bandwidth for a group of services is set to a constant value that is not changed frequently. The present invention further provides a bandwidth allocation method in a switched distribution network. The bandwidth allocation method allocates bandwidth such that the bandwidth required by the number of services does not exceed the allocation, i.e., the total usage falls within the allocation.

20 Claims, 12 Drawing Sheets

(51) Int. Cl.
*H04N 7/173* (2011.01)
*H04N 21/2543* (2011.01)
*H04N 21/418* (2011.01)
*H04N 21/472* (2011.01)
*H04N 21/61* (2011.01)
*H04N 21/6373* (2011.01)

(52) U.S. Cl.
CPC ..... *H04N 7/17318* (2013.01); *H04N 21/2543* (2013.01); *H04N 21/4181* (2013.01); *H04N 21/47202* (2013.01); *H04N 21/6118* (2013.01); *H04N 21/6168* (2013.01); *H04N 21/6373* (2013.01)

(58) Field of Classification Search
CPC ........... H04N 21/6118; H04N 21/6168; H04N 21/6373; H04N 7/1675; H04N 7/17318
See application file for complete search history.

(56) References Cited

U.S. PATENT DOCUMENTS

| | | | |
|---|---|---|---|
| 6,088,722 | A | 7/2000 | Herz et al. |
| 6,118,472 | A | 9/2000 | Dureau et al. |
| 6,188,687 | B1 | 2/2001 | Mussman et al. |
| 6,317,885 | B1 | 11/2001 | Fries |
| 6,446,261 | B1 | 9/2002 | Rosser |
| 6,463,585 | B1 | 10/2002 | Hendricks et al. |
| 6,687,735 | B1 | 2/2004 | Logston et al. |
| 7,020,893 | B2 | 3/2006 | Connelly |
| 7,171,687 | B2 | 1/2007 | Uemura |
| 7,197,472 | B2 | 3/2007 | Conkwright et al. |
| 7,266,122 | B1 | 9/2007 | Hogg et al. |
| 7,284,064 | B1 | 10/2007 | Connelly |
| 7,292,602 | B1 | 11/2007 | Liu et al. |
| 7,324,552 | B1 | 1/2008 | Galand et al. |
| 7,327,679 | B2 | 2/2008 | Naor et al. |
| 7,330,893 | B2 | 2/2008 | Qiu et al. |
| 7,334,044 | B1 | 2/2008 | Allen |
| 7,336,967 | B2 | 2/2008 | Kelly et al. |
| 7,340,759 | B1 | 3/2008 | Rodriguez |
| 7,391,780 | B1 * | 6/2008 | Stone ................. H04L 41/0896 370/252 |
| 7,409,140 | B2 | 8/2008 | Rodriguez et al. |
| 7,457,520 | B2 | 11/2008 | Rossetti et al. |
| 7,500,235 | B2 | 3/2009 | Maynard et al. |
| 7,602,820 | B2 | 10/2009 | Helms et al. |
| 7,650,619 | B2 | 1/2010 | Mineyama |
| 7,787,539 | B2 | 8/2010 | Chen |
| 7,831,989 | B1 | 11/2010 | Calzone et al. |
| 7,843,856 | B2 * | 11/2010 | Ramakrishnan .... H04L 41/0896 370/258 |
| 7,889,765 | B2 | 2/2011 | Brooks et al. |
| 7,895,445 | B1 | 2/2011 | Albanese et al. |
| 8,015,306 | B2 | 9/2011 | Bowman |
| 8,032,914 | B2 | 10/2011 | Rodriguez |
| 8,056,103 | B2 | 11/2011 | Candelore |
| 8,266,429 | B2 | 9/2012 | Helms et al. |
| 8,347,341 | B2 | 1/2013 | Markley et al. |
| 8,522,293 | B2 | 8/2013 | Gonder et al. |
| 8,582,584 | B2 | 11/2013 | Rieger et al. |
| 8,713,623 | B2 | 4/2014 | Brooks |
| 8,731,053 | B2 | 5/2014 | Karegoudar |
| 9,215,423 | B2 | 12/2015 | Kimble et al. |
| 9,270,944 | B2 | 2/2016 | Brooks et al. |
| 9,432,710 | B2 | 8/2016 | Hill et al. |
| 2001/0039656 | A1 | 11/2001 | Nakamura et al. |
| 2001/0050924 | A1 | 12/2001 | Herrmann et al. |
| 2002/0013948 | A1 | 1/2002 | Aguayo et al. |
| 2002/0026645 | A1 | 2/2002 | Son et al. |
| 2002/0032754 | A1 | 3/2002 | Logston et al. |
| 2002/0078444 | A1 | 6/2002 | Krewin et al. |
| 2002/0087976 | A1 | 7/2002 | Kaplan et al. |
| 2002/0123928 | A1 | 9/2002 | Eldering et al. |
| 2002/0178446 | A1 | 11/2002 | Sie et al. |
| 2003/0018973 | A1 | 1/2003 | Thompson |
| 2003/0043789 | A1 | 3/2003 | Okajima et al. |
| 2003/0056217 | A1 | 3/2003 | Brooks |
| 2003/0126611 | A1 | 7/2003 | Chernock et al. |
| 2003/0135853 | A1 | 7/2003 | Goldman et al. |
| 2003/0135860 | A1 | 7/2003 | Dureau |
| 2003/0140351 | A1 | 7/2003 | Hoarty et al. |
| 2003/0142690 | A1 | 7/2003 | Beser |
| 2003/0145323 | A1 | 7/2003 | Hendricks et al. |
| 2003/0177488 | A1 | 9/2003 | Smith et al. |
| 2003/0217365 | A1 | 11/2003 | Caputo |
| 2003/0221191 | A1 | 11/2003 | Khusheim |
| 2004/0010588 | A1 | 1/2004 | Slater et al. |
| 2004/0019913 | A1 | 1/2004 | Wong et al. |
| 2004/0057457 | A1 | 3/2004 | Ahn et al. |
| 2004/0133701 | A1 | 7/2004 | Karaoguz et al. |
| 2004/0133907 | A1 | 7/2004 | Rodriguez et al. |
| 2004/0189879 | A1 | 9/2004 | Read |
| 2004/0210628 | A1 | 10/2004 | Inkinen et al. |
| 2004/0261094 | A1 | 12/2004 | Huslak et al. |
| 2005/0002418 | A1 | 1/2005 | Yang et al. |
| 2005/0034171 | A1 | 2/2005 | Benya |
| 2005/0047501 | A1 | 3/2005 | Yoshida et al. |
| 2005/0055685 | A1 | 3/2005 | Maynard et al. |
| 2005/0066355 | A1 | 3/2005 | Cromer et al. |
| 2005/0202827 | A1 | 9/2005 | DeMarco et al. |
| 2005/0235307 | A1 | 10/2005 | Relan et al. |
| 2005/0240966 | A1 | 10/2005 | Hindle et al. |
| 2005/0289618 | A1 | 12/2005 | Hardin |
| 2006/0056437 | A1 | 3/2006 | Fishwick |
| 2006/0130107 | A1 | 6/2006 | Gonder et al. |
| 2006/0140206 | A1 | 6/2006 | Kataria et al. |
| 2006/0165173 | A1 | 7/2006 | Kim et al. |
| 2006/0171423 | A1 | 8/2006 | Helms et al. |
| 2007/0002897 | A1 | 1/2007 | Goshen et al. |
| 2007/0022459 | A1 | 1/2007 | Gaebel et al. |
| 2007/0076728 | A1 | 4/2007 | Rieger et al. |
| 2007/0104222 | A1 | 5/2007 | Luss |
| 2007/0116048 | A1 | 5/2007 | Addington |
| 2007/0121678 | A1 | 5/2007 | Brooks et al. |
| 2007/0136753 | A1 | 6/2007 | Bovenschulte et al. |
| 2007/0217436 | A1 | 9/2007 | Markley et al. |
| 2007/0298811 | A1 | 12/2007 | Hartman et al. |
| 2008/0025219 | A1 | 1/2008 | Chao et al. |
| 2008/0038251 | A1 | 2/2008 | Pastorekova et al. |
| 2008/0098212 | A1 | 4/2008 | Helms et al. |
| 2008/0134165 | A1 | 6/2008 | Anderson et al. |
| 2008/0137740 | A1 | 6/2008 | Thoreau et al. |
| 2008/0192820 | A1 | 8/2008 | Brooks et al. |
| 2008/0235746 | A1 | 9/2008 | Peters et al. |
| 2008/0273591 | A1 | 11/2008 | Brooks et al. |
| 2009/0010426 | A1 | 1/2009 | Redmond |
| 2009/0025027 | A1 | 1/2009 | Craner |
| 2009/0028182 | A1 | 1/2009 | Brooks et al. |
| 2009/0083279 | A1 | 3/2009 | Hasek |
| 2009/0183081 | A1 | 7/2009 | Rodriguez et al. |
| 2009/0193485 | A1 | 7/2009 | Rieger et al. |
| 2009/0213871 | A1 | 8/2009 | Carlson et al. |
| 2010/0023972 | A1 | 1/2010 | Summers et al. |
| 2010/0083329 | A1 | 4/2010 | Joyce et al. |
| 2010/0100915 | A1 | 4/2010 | Krikorian et al. |
| 2010/0135646 | A1 | 6/2010 | Bang et al. |
| 2010/0251305 | A1 | 9/2010 | Kimble et al. |
| 2010/0312861 | A1 | 12/2010 | Kolhi et al. |
| 2010/0313225 | A1 | 12/2010 | Cholas et al. |
| 2010/0325666 | A1 | 12/2010 | Wiser et al. |
| 2011/0016479 | A1 | 1/2011 | Tidwell et al. |
| 2011/0044227 | A1 | 2/2011 | Harrang et al. |
| 2011/0090898 | A1 | 4/2011 | Patel et al. |
| 2011/0093900 | A1 | 4/2011 | Patel et al. |
| 2011/0296046 | A1 | 12/2011 | Arya et al. |
| 2012/0131623 | A1 | 5/2012 | McDysan et al. |
| 2013/0125175 | A1 | 5/2013 | Hao et al. |
| 2013/0166690 | A1 | 6/2013 | Shatzkamer |

FOREIGN PATENT DOCUMENTS

| | | |
|---|---|---|
| WO | WO-0139505 A2 | 5/2001 |
| WO | WO-0219249 A2 | 3/2002 |

(56) References Cited

FOREIGN PATENT DOCUMENTS

| WO | WO-02080547 A2 | 10/2002 |
| WO | WO-03103292 A1 | 12/2003 |
| WO | WO-2004075489 A1 | 9/2004 |

* cited by examiner

| Service Pool Example | | |
|---|---|---|
| The Disney Channel | 3.75 | Mbits |
| Sci-Fi | 4.25 | Mbits |
| The Golf Channel | 3.50 | Mbits |
| The History Channel | 3.75 | Mbits |
| Home & Garden Television | 4.25 | Mbits |
| Turner Classic Movies | 3.50 | Mbits |
| ESPN-2 | 3.75 | Mbits |
| The Discovery Channel | 4.25 | Mbits |
| American Movie Classics | 3.50 | Mbits |
| TNT | 3.75 | Mbits |
| ABC Family Channel | 4.25 | Mbits |
| TBS Superstation | 3.50 | Mbits |
| A&E | 3.75 | Mbits |
| The Weather Channel | 4.25 | Mbits |
| Nickelodeon | 3.50 | Mbits |
| USA Network | 16.75 | Mbits |
| Lifetime Television | 4.25 | Mbits |
| Doppler Weather Radar | 3.63 | Mbits |
| Spike TV | 3.75 | Mbits |
| CNN Headline News | 3.75 | Mbits |
| CNN | 4.00 | Mbits |
| CNBC | 19.20 | Mbits |
| VH1 | 4.25 | Mbits |
| E! | 3.50 | Mbits |
| Black Entertainment Telev | 3.75 | Mbits |
| MTV Music Television | 4.25 | Mbits |
| CMT | 3.50 | Mbits |
| Comedy Central | 3.75 | Mbits |
| Court TV | 4.25 | Mbits |
| Fox Sports Southwest | 3.63 | Mbits |
| ESPN | 3.75 | Mbits |
| Telemundo Network | 3.75 | Mbits |
| TV Land | 4.00 | Mbits |
| Fox News Channel | 3.75 | Mbits |
| Food Network | 3.75 | Mbits |
| WGN | 15.00 | Mbits |
| Animal Planet | 19.20 | Mbits |

FIG. 4

METHODS AND APPARATUS FOR PREDICTIVE CAPACITY ALLOCATION

PRIORITY AND RELATED APPLICATIONS

This application is a continuation of and claims the benefit of priority to U.S. patent application Ser. No. 11/800,093 entitled the same, filed May 4, 2007, issued as U.S. Pat. No. 9,398,346 on Jul. 19, 2016, which is incorporated by reference herein in its entirety.

This application is related to co-owned U.S. patent application Ser. No. 11/243,720 filed Oct. 4, 2005 and entitled "SELF-MONITORING AND OPTIMIZING NETWORK APPARATUS AND METHODS", issued as U.S. Pat. No. 8,582,584 on Nov. 12, 2013 which is incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content-based (e.g., cable, satellite, etc.) distribution networks. In one exemplary aspect, the present invention relates to efficiently managing bandwidth allocation to multimedia programs by utilizing historical bandwidth usage by a user or a group of users.

2. Description of Related Technology

One significant competitive challenge presently faced by operators of content-based networks relates to managing and conserving bandwidth. This includes the reclamation of otherwise under-utilized or unused bandwidth such that the service or customer base can be expanded without significant modifications or build-outs of the underlying network infrastructure. For example, it is desirable to expand the types and availability of "next-generation" network services, including high-definition (HD) broadcast, VOD, high-speed data (HSD), VoIP, Interactive TV, etc. over time, without the need for major capital expenditures or system modifications. Hence, network operators are increasingly focused on techniques for "squeezing" as much capacity out of their existing networks as possible.

In a conventional cable network, bandwidth planning and usage tends to be relatively static over time. A network operator periodically changes the channel line-up to delete channels, add new channels and services or change the relationship between logical channel map and frequency domain location of the channels. Channel line-up changes are done typically few times a year to meet the engineering and business needs and resource available in the network. Thus, channels available in the network stay relatively static when compared to the frequency with which subscribers tune in and out of various program channels.

Typically, a tradeoff must be made between allocating bandwidth to programs currently carried on the network to meet or exceed their quality requirements, yet at the same time keeping sufficient bandwidth in reserve to be made available to new program requests, or sudden changes in available network bandwidth resources (e.g., equipment failure).

With the availability of new technologies such as high definition (HD) programming and streaming technologies to provide users with individualized content, network operators are facing bandwidth "crunch" of sorts, and have started looking at delivery methods on their content networks to optimally utilized bandwidth. One such technology comprises a "switched" network architecture (commonly referred to as switched digital broadcast (SDB), or broadcast switched architecture (BSA)). In such a network, individualized program delivery can be provided to each subscriber.

This new way of offering programming is also changing the conventional ways in which network bandwidth demand changes over a period of time. There is a need for the network operators to meet such fluctuating bandwidth demand by deploying bandwidth allocation strategies that adapt to such changes in bandwidth demand. However, as mentioned before, in conventional content distribution networks, the bandwidth assigned by a cable network operator to the programs distributed over his network is relatively static. The RF spectrum available for transmission over the coaxial part of a cable network is typically divided into 6 MHz channels. A cable operator typically creates a channel lineup by assigning the 6 MHz channels to service tiers such as analog cable, digital cable, video on demand service and data service. For example, the bandwidth available to programs watched by viewers may exceed the actual utilization, in which case the excess bandwidth may be wasted. It is also possible that bandwidth available to programs watched by viewers may fall short of the demand. This may result undesirable effect that additional viewing requests from users may have to be rejected, or bandwidth allocated to programs may have to be reduced, resulting in a loss in the quality of service. Therefore, network operators have begun looking at ways to manage the available bandwidth more intelligently, especially within heterogeneous networks (i.e., those that deliver broadcast, switched broadcast, IP, and session-based delivery such as VOD, as well as services such as DOCSIS).

A number of different technologies for managing or allocating network bandwidth are evidenced in the prior art. For example, U.S. Pat. No. 7,171,687 to Uemura, issued Jan. 30, 2007 entitled "Content Distribution Apparatus" discloses an apparatus acquire contents prior to a distribution request from a client in a time zone having sufficient network bandwidth, and efficiently use network bandwidth. An access trends analysis handler analyzes access to contents by a client, a contents prediction handler predicts contents expected to be in demand in the future based on this analysis result, and a contents acquisition handler acquires the forecast contents in a time zone when there is sufficient network bandwidth. A contents deletion handler predicts contents in the acquired contents for which not much demand is expected from the client contents access trends, and deletes these contents. Due to this invention, a contents distribution apparatus can be provided which enables efficient use of network bandwidth and disk capacity.

United States Patent Application Publication No. 20050202827 to De Marco, et al. published Sep. 15, 2005 entitled "SYSTEM FOR PREDICTIVELY AND DYNAMICALLY ALLOCATING COMMUNICATION BANDWIDTH", that issued as U.S. Pat. No. 7,120,445 on Oct. 10, 2006 discloses a system that predictively allocates bandwidth within a wireless network in accordance with a mission plan. The system includes a first team member and a second team member. The first team member predicts subsequent communication demand by the second team member in accordance with the mission plan. The second team member predicts subsequent communication demand by the first team member in accordance with the mission plan. The first team member is allocated a bandwidth commensurate with a predicted need of the first team member and a predicted need of the second team member. The second team member being allocated a bandwidth commensurate with a predicted need of the first team member and the second team member.

Unfortunately, the above cited prior art fails to provide a comprehensive solution to the aforementioned issues associated with content distribution networks. Specifically, there is a need for improved methods and apparatus adapted to effectively and (ideally automatically) to manage network bandwidth allocation to overcome problems with the previously discussed static allocation approach. For the ease of deployment in a content distribution network, such improved methods and apparatus should also be one that requires minimal changes to existing infrastructure and also is flexible to allow operator to change operational parameters to adapt the technique to run-time changes in the network bandwidth utilization.

It would also be ideal to provide methods and apparatus that allow the network operator to exceed program quality or bitrate requirements (in terms of bandwidth), yet at the same time avoid having to keep undue amounts of bandwidth in reserve to make it available to new program requests or sudden changes in available network resources.

SUMMARY OF THE INVENTION

The present invention satisfies the foregoing needs by providing, inter alia, methods and apparatus for predictive capacity allocation within a content based network.

In a first aspect, a method of operating a content-based network is disclosed. In one embodiment, the method comprises: obtaining first data relating to the operation of the network over a period of time; identifying at least one correlation between the first data and a future context; and projecting at least one parameter for the future context based at least in part on the first data.

In one variant, the content-based network comprises a cable television network, the first data comprises data indicating actual bandwidth demand within at least a portion of the period, and the future context comprises a future period of time. The correlation comprises a correlation between the period of time of the first data and the future period of time (which may comprise e.g., the same day of the week, the same portion of a 24-hour day, the same holiday, etc.).

In another variant, the identifying at least one correlation between the first data and a future context comprises matching at least a first portion of a pattern reflected in the first data to a pattern observed in a present context; and the projecting comprises projecting based on a second portion of the pattern.

In another embodiment, the method comprises: providing a template describing at least one aspect of the operation of the network over a period of time; correlating the template and a future context; and projecting at least one parameter for the future context based at least in part on the template.

In one variant of this embodiment, the content-based network comprises a cable television network, and the providing a template describing at least one aspect comprises providing data indicating actual bandwidth demand over at least a portion of a historical period. The future context comprises e.g., a future period of time, and the correlating comprises a correlation between the historical period and the future period of time such as the same day of the week, the same portion of a 24-hour day, the same holiday, and so forth.

In another variant, the template describing at least one aspect comprises data indicating actual bandwidth demand over at least a portion of a historical period, the data having a given pattern or shape, and the act of projecting comprises generating a projection of bandwidth demand that substantially conforms to the pattern or shape.

In still another variant, the data indicating actual bandwidth demand over at least a portion of a historical period has a given pattern or shape, and the act of projecting comprises generating a projection of bandwidth demand that substantially conforms to the pattern or shape.

In yet another embodiment, the method comprises: generating a projection of the capacity requirements for a plurality of services requested for delivery over the network, the projection being based at least in part on a model; allocating capacity within the network based at least in part on the projection; evaluating the projection based at least in part on operational data; and determining whether adjustment of the model is required.

In one variant, the content-based network comprises a cable television network, and the plurality of services are requested by a plurality of customer premises devices of the network. The services comprise streaming or download requests for content.

In another variant, the method further comprises adjusting the model based at least in part on the determining; e.g., adjusting in an incremental fashion utilizing a feedback mechanism so as to avoid substantial overshoot.

In another variant, the model comprises at least one behavioral template, and the adjusting comprises utilizing a different template.

In a second aspect of the invention, apparatus for allocating bandwidth in a content-based network having at least one server is disclosed. In one embodiment, the apparatus comprises: a computerized device; and at least one management process capable of being run on the computerized device, the process being operative to: collect data relating to historical bandwidth demand; project, based at least in part on the collected data, bandwidth demand at some period in the future; and allocate bandwidth within the network based at least in part on the projection.

In one variant, the apparatus further comprises a database in data communication with the computerized device, the database comprising a plurality of the data, and a substantially computerized process adapted to update the database with recently acquired data at least periodically, the recently acquired data relating to actual bandwidth demand within the network.

In another variant, the apparatus further comprises a substantially computerized process adapted to, during or after the future period has elapsed, compare the projection of bandwidth demand with actual demand relating to the future period, and determine differences there between. The substantially computerized process is further adapted to cause adjustment to the management process based at least in part on the differences; e.g., adjusting the frequency or periodicity with which the projection is performed.

In yet another variant, the network comprises a cable television network, and the computerized device comprises a server disposed at a headend of the network.

Alternatively, the network comprises a broadcast switched architecture (BSA) cable television network, and the computerized device comprises a device disposed at a switching hub of the network.

In still another variant, the projection based at least in part on the data comprises correlating at least one feature within the collected data to the period in the future, the at least one feature within the collected data comprises a particular time period of a particular day in the week, and the period in the future comprises the same time period of the same day of the week.

In a third aspect of the invention, a method of allocating bandwidth to a group of programs in a network is disclosed. In one embodiment, the method comprises: gathering data from a program source, the data relating to bandwidth requirements over a time interval for at least one program in the group of programs ingested in the network by the source, storing the data into a database; subsequently analyzing at least the data to identify one or more features of significance therein; using at least one of the features to determine a value of at least one operational parameter used in operating the network; and basing an allocation of bandwidth to the group of programs in the network at least in part on the value.

In one variant, the network comprises a cable television network, and the source comprises a program source ingress (PSI) server disposed at a headend of the network.

In another variant, the act of analyzing to identify one or more features comprises identifying at least one correlation between a historical event and a recently observed event.

In still another variant, the act of analyzing data from the database comprises statistically analyzing data corresponding to a plurality of the programs.

In a fourth aspect of the invention, apparatus for allocating bandwidth in a content distribution network having at least one server and a plurality of consumer premises equipment (CPE) is disclosed. In one embodiment, the apparatus comprises: a first network side process running on the at least one server, the first network side process configured to monitor bandwidth required to distribute content to a subset of the CPE; a second network side process running on the at least one server, the second network side process configured to predict bandwidth required to distribute the content to the subset of the CPE at a future time; and a third network side process running on the at least one server, the third network side process configured to allocate bandwidth to distribute content to the subset of the CPE at the future time. The second network side process comprises at least one computer program adapted to analyze past bandwidth utilization by the subset of the CPE, and base the prediction at least partly thereon. The apparatus further may comprise a historical database in data communication with the at least one server.

In one variant, the network comprises a cable television network, the CPE comprises set-top boxes, and the server comprises a video-on demand (VOD) server.

In another variant, the network comprises a cable television network, and the server comprises a broadcast switched architecture (BSA) server.

In a fifth aspect of the invention, a method of operating a content-based network is disclosed. In one embodiment, the method comprises: receiving a plurality of requests for content for delivery, the requests comprising at least two different types of delivery; determining the type of delivery requested for at least a portion of the requests; and scheduling delivery of content for at least a portion of the requests of a first type in the future. In one variant, the at least two different types of delivery comprise: (i) real-time or streaming delivery; and (ii) trickle or delayed download, and trickle or delayed download comprises the first type.

In another variant, the scheduling of delivery comprises scheduling based at least in part on a prediction of future bandwidth demand.

In yet another variant, the scheduling of delivery comprises scheduling based at least in part on a difference between current actual bandwidth demand and capacity.

In still another variant, the scheduling of delivery of content for at least a portion of the requests of a first type in the future is used as a basis for predicting future bandwidth demand.

In a sixth aspect of the invention, a method of doing business within a content based network is disclosed. In one embodiment, the network is adapted to selectively provide program streams, and has a server and a plurality of subscribers, the subscribers each having a client device coupled to the network, and the method comprises offering at least a portion of the subscribers an incentive to utilize opportunistic capacity present in the network, the opportunistic capacity being related to a difference between a predicted demand for a resource and an actual demand for the resource at a given point or period of time.

In one variant, the resource comprises downstream bandwidth, the actual demand is related to a measured instantaneous bandwidth, and the predicted demand is based at least in part on historical data.

These and other aspects of the invention shall become apparent when considered in light of the disclosure provided herein.

BRIEF DESCRIPTION OF THE DRAWINGS

FIG. 4 shows exemplary bandwidth table useful with the present invention.

DETAILED DESCRIPTION OF THE INVENTION

Figure 1:
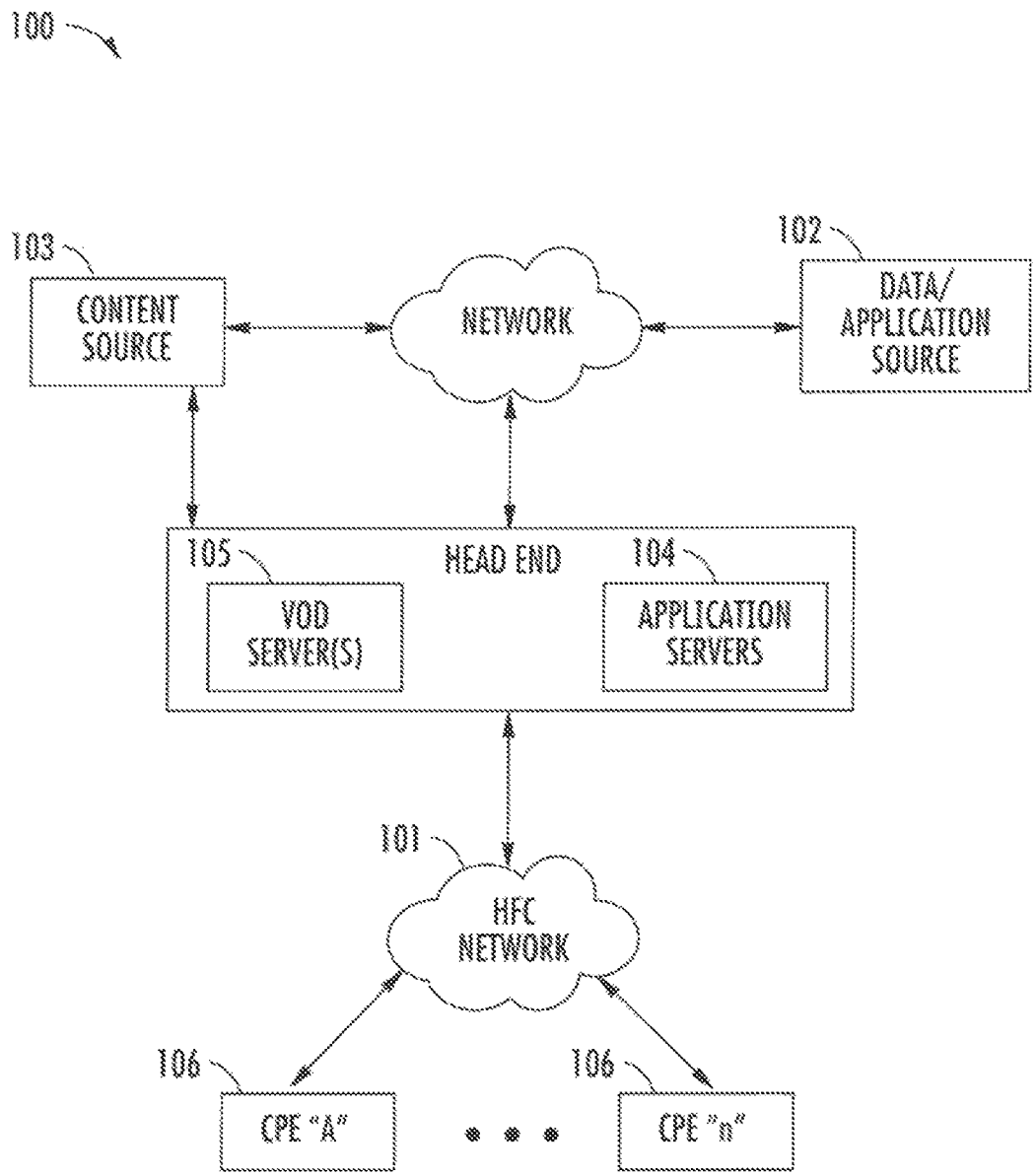
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "capacity" refers to, without limitation, the ability of a network, portion of a network, or component thereof (whether individually or in concert) to provide a requested or needed service, act, or level of performance. One commonly used metric of capacity is so-called "bandwidth", roughly akin to the size of the channel or "pipe" capable of carrying content or other information. However, capacity limitations may be imposed by any number of factors, such as the unavailability of the content from a provider (e.g., studio or television network), delays imposed by transmission, filtering, transcoding, encryption/decryption, conditional access establishment and/or download (e.g., according to a "DCAS" or downloadable conditional access system paradigm), and so forth.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation VLSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.)

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, 16QAM, 64QAM, 256QAM, etc.) depending on details of a cable network. A QAM may also refer to a physical channel modulated according to said schemes.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "server" refers to any computerized component, system or entity regardless of form which is adapted to provide data, files, applications, content, or other services to one or more other devices or entities on a computer network.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "trickle download" refers to without limitation any delivery or download mode which is at a rate appreciably less than the maximum capability of the extant network over which the downloaded content is being delivered. For example, one type of trickle download might comprise a slow, substantially constant rate download "in the background" using small amounts of excess primary bandwidth capability. Trickle downloads may be programmatic (e.g., predetermined to continue in one session until complete, such as based on a bandwidth reservation), or may also be opportunistic; e.g., conducted in two or more segments as excess capacity becomes available.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11 a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention discloses methods and apparatus for, inter alia, predicting future demands on network capacity or resources (e.g., bandwidth), and operating the network (including allocating capacity or resources) based on these predictions.

As previously described, current paradigms of bandwidth management are largely static, and require a network operator to make tradeoffs between allocating bandwidth to programs currently carried on the network so as to meet or exceed their quality/bitrate requirements, yet at the same time keep sufficient bandwidth in reserve for new program requests and unanticipated transients, demand excursions or operational events.

The present invention accordingly overcomes the deficiencies associated with the aforementioned "static" approach by implementing a capacity (e.g., bandwidth) management function that allocates bandwidth by making use of historical bandwidth utilization. Specifically, one use of this historical data is to generate predictions regarding future time periods or events that bear some correlation to the historical data (e.g., the same period of a 24-hour day, the same day of the week, the same holiday, and so forth).

The network operator can deploy this bandwidth management function in one embodiment as a Predictive Bandwidth Management (PBM) server that works with other network servers or components to allocate bandwidth.

In the exemplary embodiment, the predictive algorithms of the invention are self-adjusting or self-healing; e.g., by comparing the predictions to actual demand on a periodic or even continuous basis, the algorithm can assess how accurate its predictions were, and make necessary adjustments in order to, inter alia, more closely tailor the predictions to actual demand, while still accounting for new requests and unplanned events.

The network operator can configure the PBM server to operate on all programs and services carried over the network. Alternatively, the PBM server can be configured to limit the operation of the PBM server to a subset of all programs, and perform other conventional techniques to manage the remainder of the bandwidth.

In another aspect, methods and apparatus for determining the type of download or delivery request, and scheduling this based at least in part on the type (and relationship between predicted and actual bandwidth) are disclosed.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable architecture having a multiple systems operator (MSO), digital networking capability, and plurality of client devices/CPE, the general principles and advantages of the invention may be extended to other types of networks and architectures where bandwidth conservation is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over future satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

It is also noted that while the following discussion is cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth conservation between three service levels (SD, HD, and UHD). As another option, multiple levels or rates may be present with one of the aforementioned service levels, such as where the SD level includes levels SD1, SD2, SDn, and/or the HD level similarly includes HD1, HD2, . . . HDn, with each of these sub-levels having different data rates and/or other characteristics. Alternatively, bandwidth conservation according to the present invention may be performed not based on definition level (data rate), but some other attribute such as for example the selective availability of a type of service (e.g., OD, IPTV, or DVR/PVR). Various alternate conservation schemes are described subsequently herein in greater detail.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Additionally, the invention is in no way limited to any particular modulation type or medium access scheme, and can be implemented using for example QAM, orthogonal frequency division multiplexing (OFDM), sigma-delta modulation (SDM), time-division multiplexing (TDM), etc.

Network—

FIG. 1 illustrates a typical content-based network configuration with which the apparatus and methods of the present invention may be used. The various components of the network 100 include (i) one or more data and application origination points 102; (ii) one or more content sources 103; (iii) one or more application distribution servers 104; (iv) one or more VOD servers 105; and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
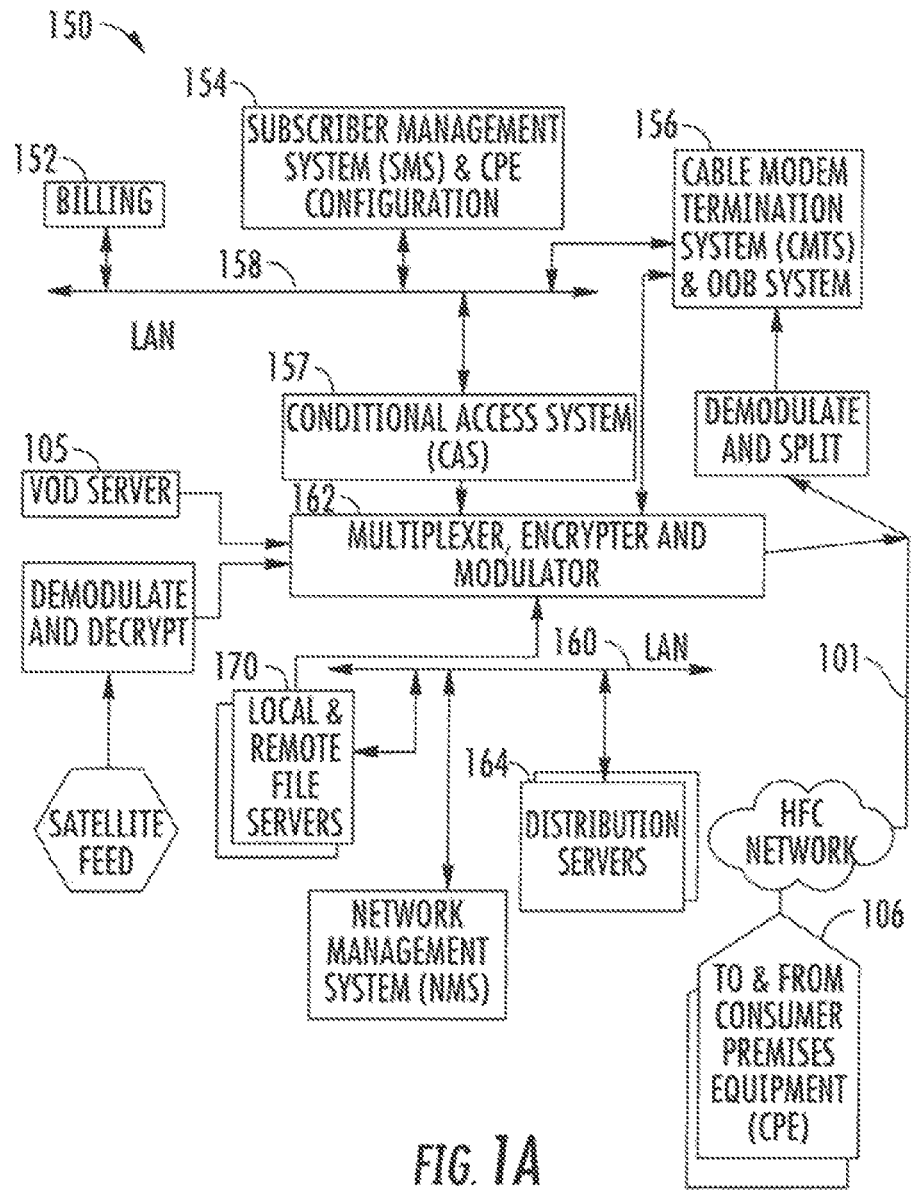
FIG. 1a is a functional block diagram illustrating one exemplary HFC cable network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs via a variety of interposed network components.

Content (e.g., audio, video, data, files, etc.) is provided in each downstream (e.g., in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

Figure 1B:
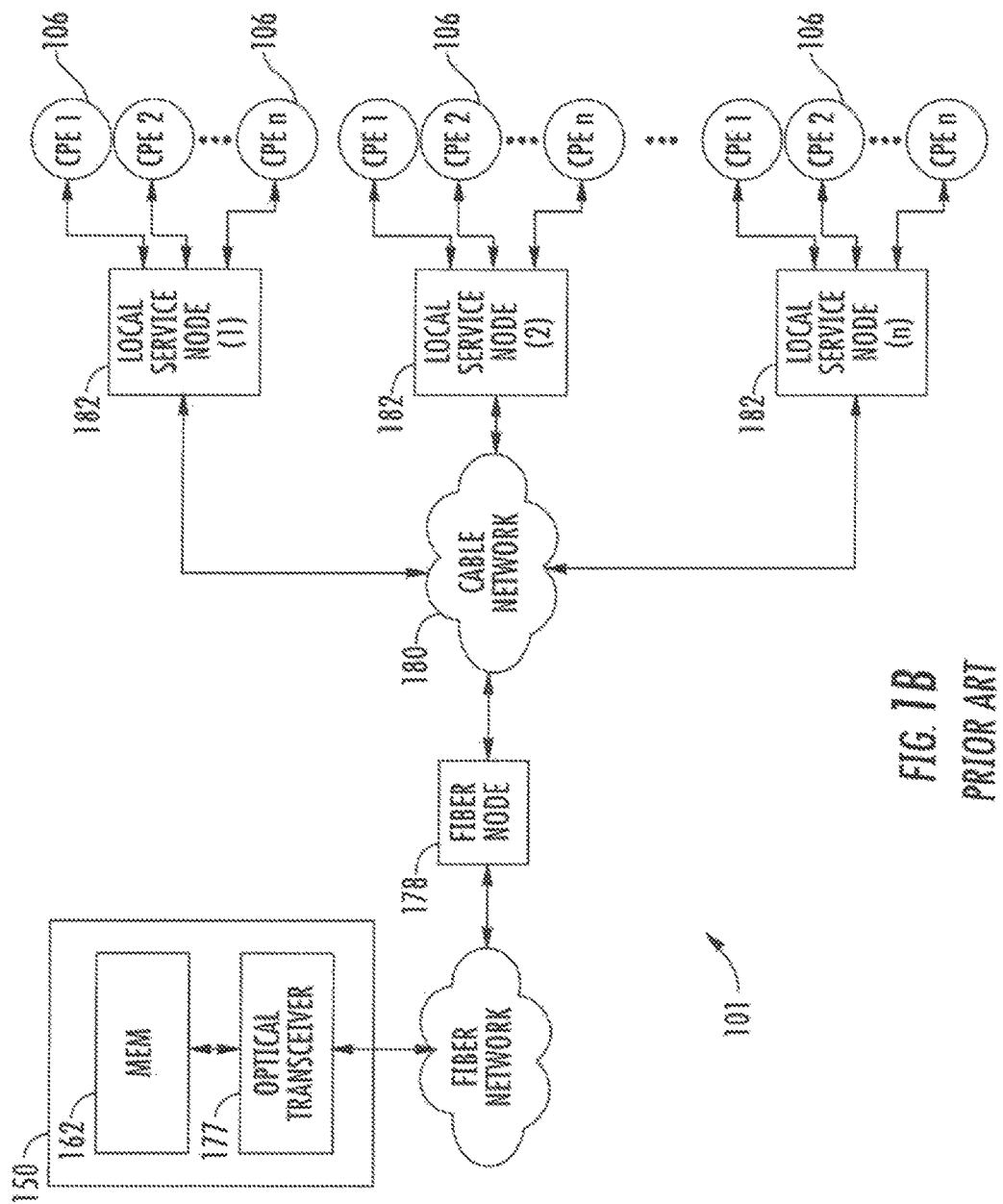
FIG. 1b is a functional block diagram illustrating one exemplary local service node configuration useful with the present invention.
Figure 1C:
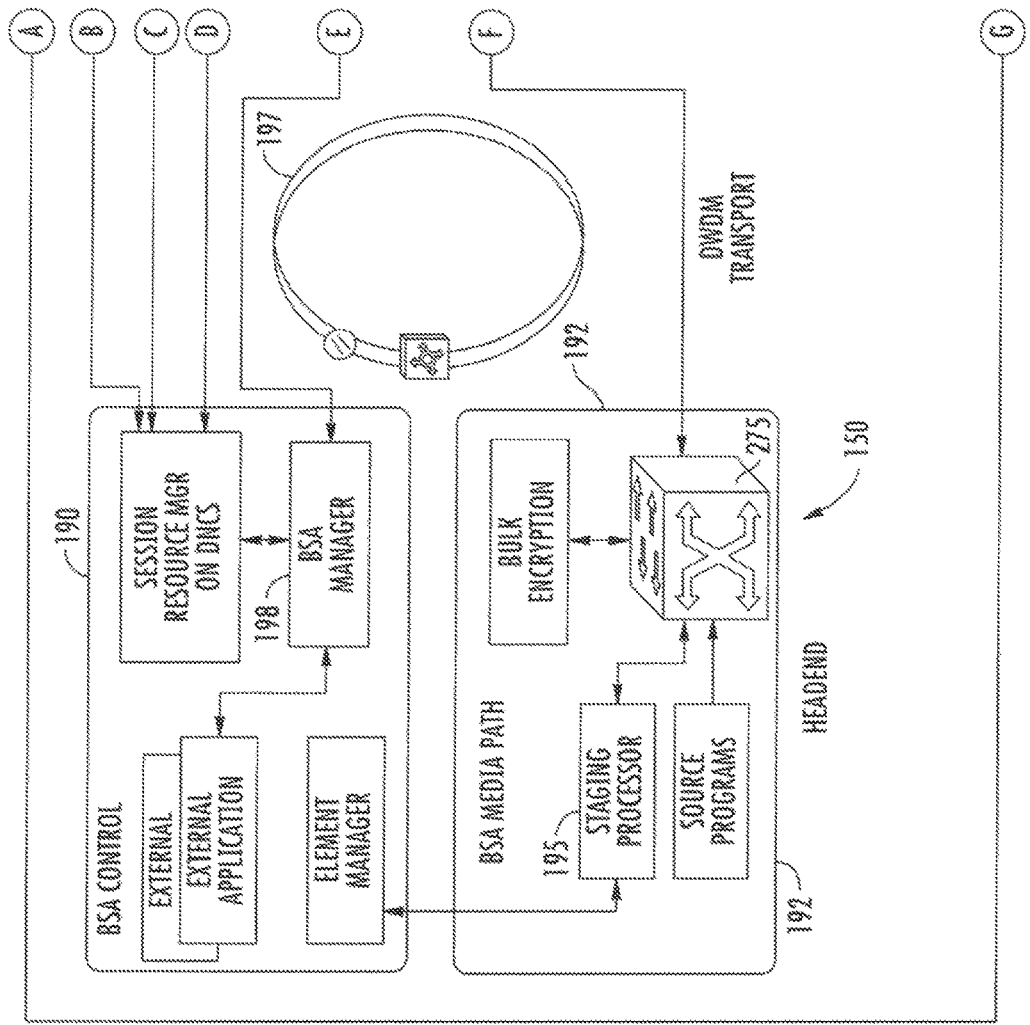
FIG. 1c is a functional block diagram illustrating one exemplary broadcast switched architecture (BSA) network useful with the present invention.
Figure 1C:
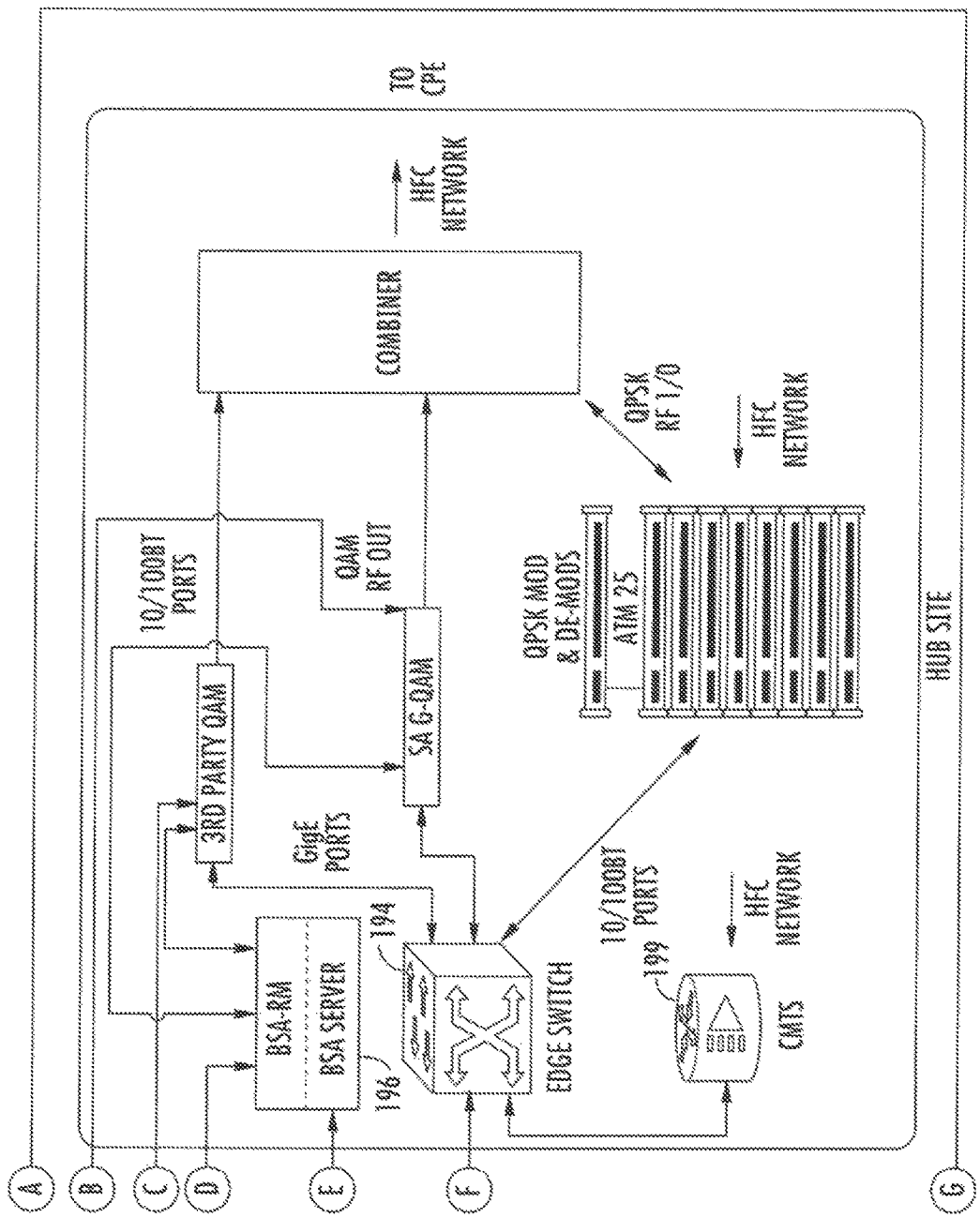

FIG. 1c illustrates an exemplary "switched" network architecture also useful with the predictive capacity apparatus and features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", that issued as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a and 1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Predictive Capacity Architecture—

Figure 2:
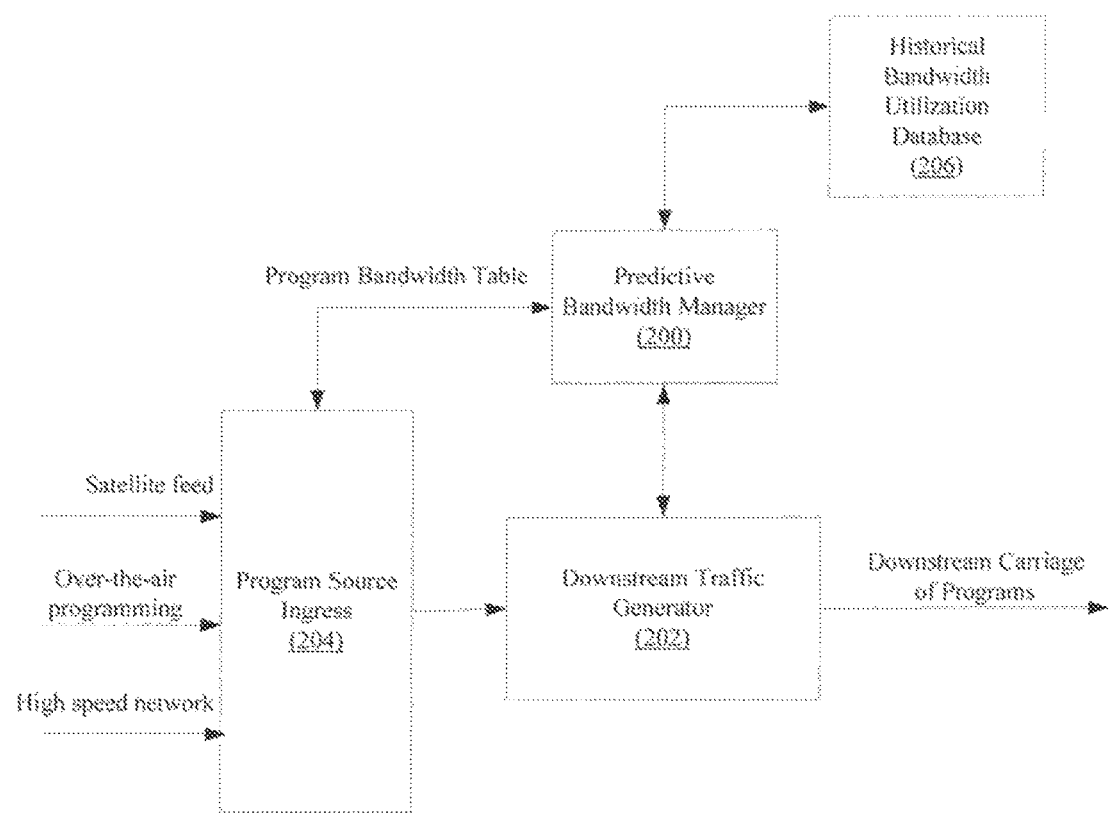
FIG. 2 is a functional block diagram illustrating one embodiment of a network architecture useful for predictive capacity management according to the invention.

FIG. 2 shows a block diagram of one exemplary embodiment of a network architecture adapted for predictive capacity management according to the present invention. It will be appreciated that while described in the context of bandwidth (i.e., the managed capacity metric or parameter being bandwidth), other capacity-related parameters may be managed as well, either individually or in conjunction with the bandwidth management of FIG. 2.

As shown in the architecture of FIG. 2, a predictive bandwidth management (PBM) function is rendered in the form of a computer program (or programs) disposed on a server 200 that is in data communication with a Program Source Ingress (PSI) server 204 and a downstream traffic generator 202. In the exemplary cable television network, the PSI server performs the function of inter alia aggregating content coming in from various sources such as satellite feeds, high-speed data (HSD) networks bearing content, and over-the-air broadcast stations. Because the PSI server acts as the point of ingress of a program or service, the PSI server 204 has knowledge of the bandwidth requirements associated with each program that ingresses the network. In one embodiment, the PSI is implemented as a number of integrated satellite receiver decoder (IRD) boxes, terrestrial television receivers and/or gigabit Ethernet (GBE) receivers configured to receive television programs or similar content elements, and convert them to an MPEG transport stream to feed the downstream traffic generator 202.

The exemplary downstream traffic generator 202 of FIG. 2 performs the function of multiplexing various programs from its input to a format suitable for downstream carriage of programs. For example, the traffic generator 202 may include functions such as re-multiplexing, rate adjustment, transcoding, multicast replication, insertion of other content such as advertising, insertion of opportunistic packets (see e.g., co-owned U.S. patent application Ser. No. 11/291,328 filed Nov. 30, 2005, issued as U.S. Pat. No. 7,889,765 on Feb. 15, 2011, and entitled "APPARATUS AND METHODS FOR UTILIZING VARIABLE RATE PROGRAM STREAMS IN A NETWORK", incorporated herein by reference in its entirety, for one exemplary apparatus and methods useful for such opportunistic insertion), modulation, and encryption. The downstream traffic generator could, for example, comprise the MEM module 162 of FIG. 1a. Alternatively, in the case of a BSA or other network of the type previously described herein, the downstream traffic generator function could be performed in a BSA switching hub site (FIG. 1c), or local services node 182 (FIG. 1b).

As shown in FIG. 2, the exemplary embodiment of the PBM server 200 is configured to communicate with the PSI server 204 to obtain information about programs or other content currently available on the network. Besides gathering data related to bandwidth requirements of content entering the network over a given time interval, the PBM can also obtain information from the PSI server regarding future schedules and bandwidth statistics for each program. The bandwidth statistics associated with a program being processed through the PSI server 204 may be obtained in a variety of ways. In one variant, bandwidth statistics can be made available to the PBM server 200 as part of metadata (e.g., an XML or similar file) or other such data which is transmitted along with or embedded within the content. In another variant, the bandwidth statistics can be sampled directly from the content stream such as via an encoding, decoding or transcoding process. In still another embodiment, a bandwidth profile can be provided (such as via a metadata file or third-party website or server) wherein the SI or other reference to the program stream is correlated to a bandwidth requirement that varies as a function of location within the (variable) program stream. Myriad other approaches to determining bandwidth statistics or profiles will be recognized by those of ordinary skill given the present disclosure.

In addition to the bandwidth statistics, the PBM server 200 also can store data received from the PSI server 204 into a database 206 such that contains it contains useful historical information on bandwidth utilization. The database may be local to the PBM or PSI server, disposed at a remote location, or even be distributed across multiple locations. The database may also be RAID protected (e.g., RAID 0, 1, 2, etc.) or otherwise redundant at multiple locations, so as to enhance its robustness and/or operational flexibility.

As an illustration of the above principles, the PBM 200 may predict bandwidth utilization over a short-term interval (near-term time period such as next 5 seconds) using historical data related to bandwidth utilized over a longer-term predictive interval (e.g., 5 minute interval), and jumps in bandwidth utilization from one short-term interval to the next within the longer-term predictive interval. A variety of measured or derived operational parameters can be used for such prediction, including inter alia (i) the peak bandwidth utilization over an interval (i.e., what was the maximum utilization experienced during an interval), (ii) average bandwidth utilization over an interval, (iii) average variability from one short-term interval to the next, and so forth. Combinations of the foregoing may also be used.

Additional details regarding techniques for managing bandwidth, and details of the exemplary implementation, are further described below with respect to FIGS. 3-6.

Generalized Methodology—

Figure 3:
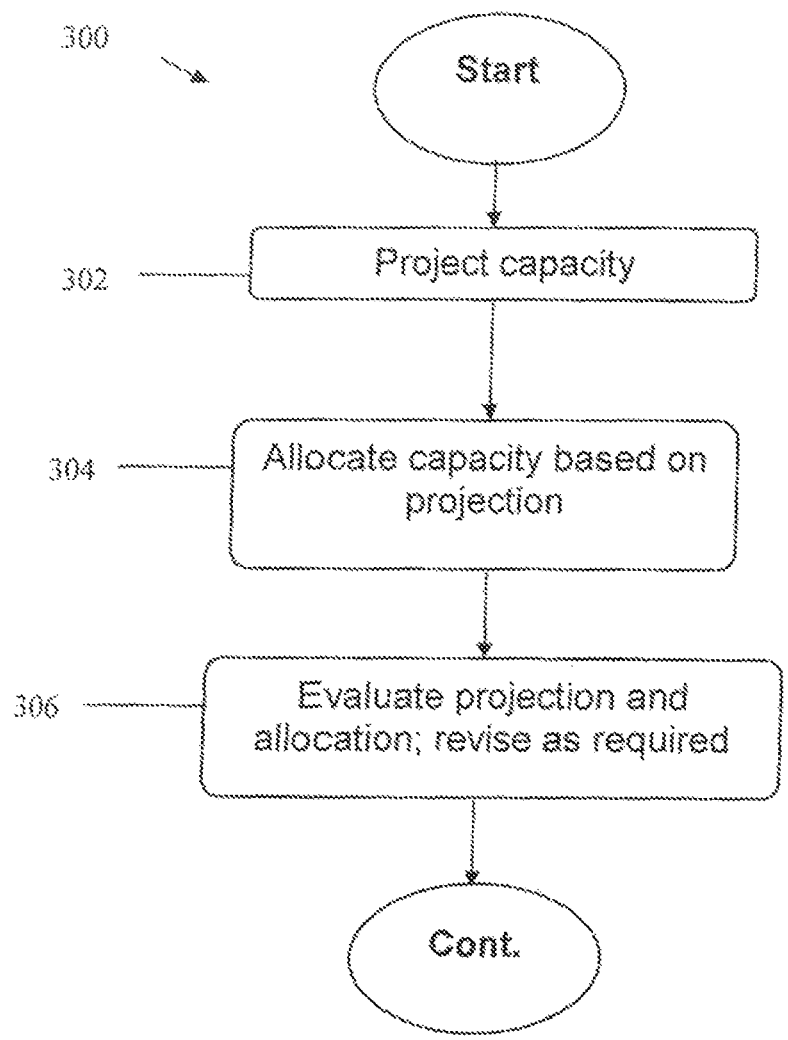
FIG. 3 is a logical flowchart illustrating one embodiment of the generalized method of predictive capacity management according to the present invention.

FIG. 3 is a logical flowchart illustrating one embodiment of the generalized method 300 of capacity management according to the present invention. It will be appreciated that while described primarily in the context of a computer program adapted to run on a network device (such as the PBM 200 of FIG. 2), the invention is in no way so limited, and such methods may be implemented using other means including even manual adjustment by an operator.

In a first step 302 of the method 300, the capacity requirements for the requested service(s) are predicted or projected. This might comprise as a simple case merely determining the maximum or clamped bitrate for a given service (or services), such as where it is known that a given program or service will never require more than X Mbps. However, in order to avoid situations where bandwidth or other capacity is wasted by overly conservative projections, the variable bitrate or other parameter can be predicted or projected as a function of time or other events, as described in greater detail elsewhere herein.

Next, per step 304, capacity within the network is allocated based at least in part on the determination performed in step 302. The capacity allocated should at least meet the projected (and actual) demand at any given point in time. This is readily accomplished by, e.g., allocating based on demand or the prediction at a given point in time.

It will also be recognized that the allocation of the present invention may feasibly be performed on a statistical or speculative basis. For example, the maximum instantaneous or peak bitrates for a number (n) of certain variable bitrate (VBR) program streams may, if occurring simultaneously, exceed available or allocated capacity; however, the statistical likelihood of all of these peak rates occurring simultaneously is so small as to make effectively inconsequential. This statistical probability can also be determined in near-real time if desired; e.g., by performing a look-ahead within all current variable bit-rate program streams to determine the SI or other reference where the maximum or critical bitrates occur, such as via a bit-rate profile (e.g., metadata file or entrained data) that is generated for each program stream upon ingestion. Alternatively, a probability or statistical profile can be used in conjunction with a given program stream, effectively indicating what percentage of time or of the total data content is associated with a given bit-rate requirement. For example, a program stream may require a peak or high bitrate for only a very small fraction of its duration, and this information can be used as an input to the aforementioned prediction algorithm; e.g., where a number of such program streams being delivered have similar characteristics, and hence the predicted demand can be lowered significantly below that required to support the maximal or peak bitrates with 100% surety.

Accordingly, the methodology of the present invention is advantageously adaptable to both deterministic and statistical models.

Lastly, per step 306, the projection and allocation are evaluated, and the projection model or basis (and or the allocation scheme) adjusted if needed. For example, one such evaluation might comprise a comparison of the actual and predicted utilizations of bandwidth over time; if more than a statistically insignificant occurrence of actual utilization exceeding predicted utilization occurs, which may e.g., degrade subscriber service or quality or cause deleterious effects within the network, then the prediction and/or allocation algorithms may be adjusted dynamically to compensate for this issue. Conversely, if the predicted capacity is always substantially in excess of the actual demand, the predictive model may be made less conservative.

Adjustment of the projection model or allocation scheme can be performed progressively. For example in cases where the actual demand exceeds the projection only on very infrequent instances, only minor corrections may be required to cause the prediction to completely envelope the actual demand curve. However, where significant excursions are present, more aggressive adjustment of the predictive model or allocation scheme are needed so as to avoid a significant impact on service. Similarly, a varying delay can be implemented so that the effect of a corrective action can be reflected within the system before a subsequent correction is inserted. This progressive "feedback" approach advantageously limits hunting of the system, as is well known in prior art control systems (e.g., PID loops, optimal control theory, etc.); i.e., too fast or too large an insertion of corrective modifications can induce instability in the system, in effect causing the system to "chase its tail".

It will also be appreciated that the foregoing methodology of FIG. 3 can be employed in a "dumb" or blind fashion; i.e., without need to know total available capacity (e.g., bandwidth), such as when no threat of exceeding maximum available capacity is present. The exemplary prediction algorithm in this case merely predicts necessary bandwidth, and allocates it, irrespective of actual available capacity. This approach simplifies the calculations and processing overhead necessary to support the prediction algorithm, but also carries the risk that the allocation algorithm will attempt to allocate more bandwidth than is actually available in the system. Hence, this approach should be limited to cases where overall loading is low, or other control factors or processes are used to prevent the over-allocation of capacity (and hence possible degradation or loss of service, or in severe cases "crashing" of portions of the network).

Exemplary Implementation—

Figure 3A:
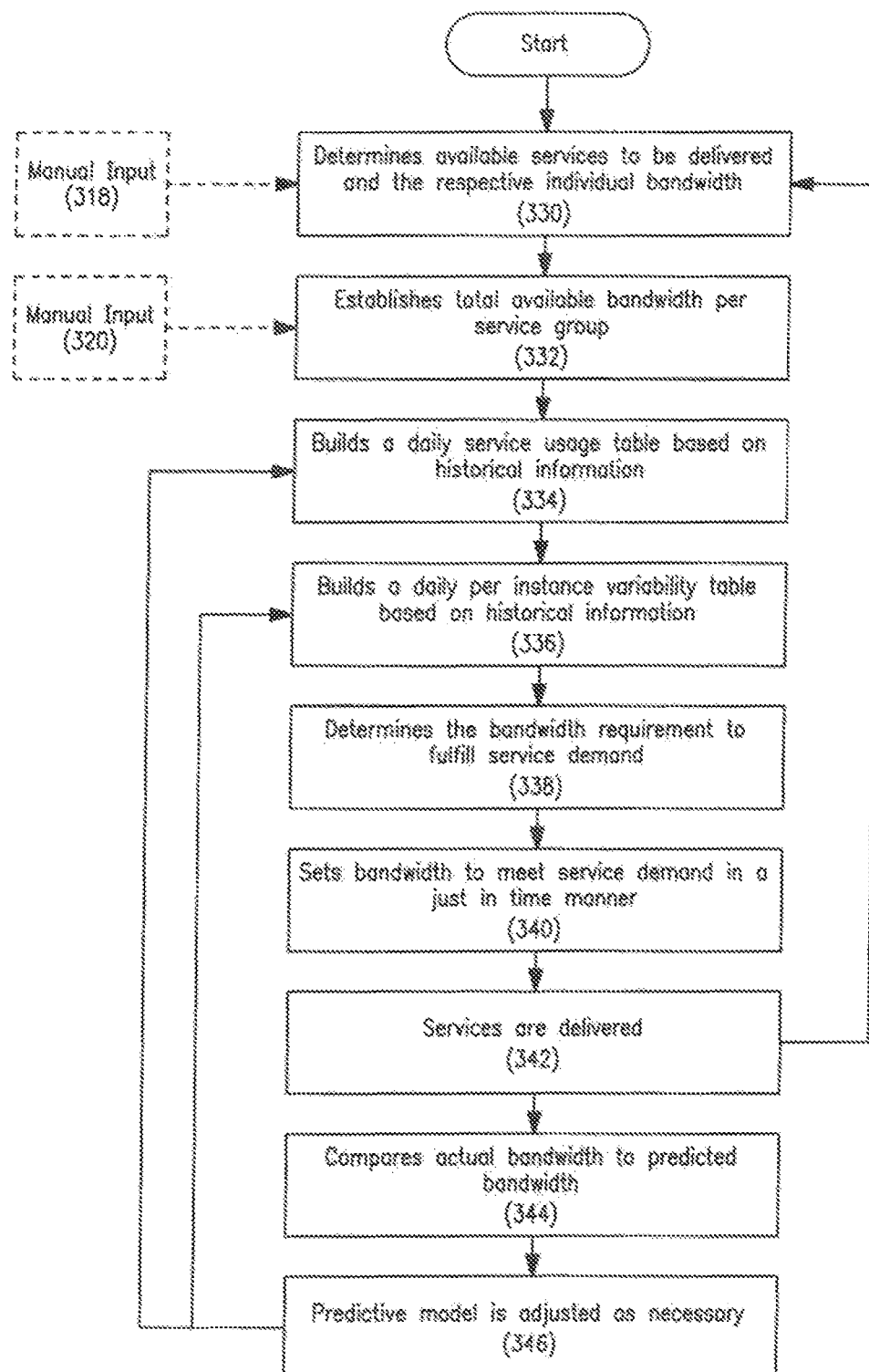
FIG. 3a is a logical flowchart illustrating one exemplary implementation of the method of FIG. 3.

FIG. 3*a* shows one exemplary and specific implementation of the generalized method 300 of FIG. 3 in the context of bandwidth management. Note that FIG. 3*a* is shown as a flow chart for illustrative purposes only, and should not be construed as representing a single-process thread. Some tasks may be performed in parallel, or in a different order or by multiple processes.

Per step 330, the PBM server 200 keeps a record of services that are available, and can be provided when subscribers make requests. FIG. 4 shows an example record of all programs available in a typical service pool. This record may be varied or updated as a function of time, including based on inputs from other network or third party processes, or the PBM process itself (e.g., based on inputs from third-party or upstream content sources, evaluation by the PBM server that it cannot properly satisfy a request for a given service under prevailing conditions, and therefore removes it, etc.). The PBM server thus has information about services made available to each group of users of the system, and one or more associated parametric values or other data (e.g., bandwidth requirement in bits/second for each program). Note that the data associated with each service may also be variable, and may comprise multiple types of information, such as where multiple service levels, codec formats, etc. are associated with a given single "service"). Moreover, as previously described, more complex types of information may be retained by the PBM or another entity in the network, such as e.g., bitrate profiles as a function of time for the program stream, probabilistic or statistical information, and so forth.

The bandwidth requirement for a service may be determined by the service provider or the network operator (shown as input 318). For example, the service provider may receive an encoded program from a content provider. The service provider may pass that program through a decoder, followed by an encoder or a re-encoder. The service provider may assess the quality of the program using various re-encoding rates. For example, the service provider may assess the quality at a re-encoding output bitrate of 4 Mb/s, 4.5 Mb/s, 5 Mb/s, and so on. The service provider may determine the re-encoding bitrate at which the quality is acceptable. In some embodiments, the service provider may store the value of the acceptable re-encoding bitrate in a service database. Alternatively, the bandwidth requirement for a service may be determined from information provided to a service provider by a content provider in association with the content to provide that service. Some programs may be available to the service provider as a Variable Bitrate (VBR) stream over a satellite or other feed. A bitrate clamp or stuffing algorithm may process that stream to output a constant bitrate stream. A service provider could determine the bandwidth requirement by this method ("bitrate clamp" method). As previously indicated with respect to FIG. 2, the PSI function 204 can provide this information in the form of a Program Bandwidth Table to the PBM server 200.

The PBM server also performs step 332 to determine a pool of available services to be delivered and their individual and total bandwidth requirements. Calculation of the total bandwidth required per service group may include methods such as querying a pre-established service database (such as one containing information of the type shown in FIG. 4), or by interactively deciding the bandwidth requirement using operator (manual) or other algorithmic inputs 320. Inputs to this process may include, for example, configuring or selecting a customized pool of services that may be available to a given service group based upon the demographics of that service group.

Although the services in FIG. 4 are shown as having fixed bandwidth requirements, the bandwidth requirements may vary with time. For example, sometimes a given "program channel" may be provided in standard definition (SD), and at other times in high definition (HD). In such cases, the functions of step 330 may be performed, for example, each time the bandwidth requirement of any service changes. Alternatively, the functions of step 330 functions may be performed at regular intervals.

In step 332, the PBM server 200 may determine total available bandwidth for a service group. For example, if the service group comprises 7 QAM carriers each capable of carrying a total of 38.8 Mb/s, then the total potentially available bandwidth is 271.6 Mb/s. However, note that the preceding example is intentionally simplified insofar as for purposes of allocating programs to QAM carriers, entire programs must be allocated to a given carrier. Depending on the bitrate requirements of individual programs, it may not be possible to fully pack one or more QAM carriers with program data up to their individual 38.8 Mb/s limits. Therefore, the "total available bandwidth" in the example is not necessarily 271.6 Mb/s, but may be 271.6 Mb/s less an amount that represents the sum of all the "left over" or wasted bandwidth of the QAM carriers that cannot be allocated because they are each too small to accommodate an entire program.

It will be appreciated that the previously described input 320 to the process of step 332 may include, for example, reserving a portion of the bandwidth potentially available to a service group as bandwidth excluded from predictive allocation. For example, the PBM server may exclude a certain amount of bandwidth from predictive allocation by reserving that bandwidth for support of VOD. The PBM server may update the bandwidth made available to a service group on an irregular basis, for example, according to overall system resource allocation policies; e.g. amount of bandwidth to be dedicated (not available for predictive allocation) to services such as VOD or high-speed data.

Next, the PBM server 200 may project or estimate the demand for service, such as broadcast video or VOD, by querying a previously calculated historical database 206 per step 334. Table A-1 in Appendix A hereto shows an example of historical bandwidth utilization data for a service group. The first column with heading "Time" shows the time of the given day. The second column with heading "Required Bandwidth" shows a preliminary estimate made by the PBM server of required bandwidth for the time interval for that row. The PBM server 200 may create the preliminary bandwidth allocation entries (second column of Table A-1) for the number of services expected to be in use throughout the day on a prescribed, configurable time interval, such as e.g., 5 seconds, based on the queried demand. Note that the bandwidth values used in Table A-1 are rounded to the nearest multiple of 3.75 Mb/s, which may typically provide the capacity for a single SD video stream. However, this rounding is done for illustration purpose only, and not in general necessary for an implementation of the present invention. In other words, the bandwidth entries in the second column of Table A-1 may be calculated to any useful granularity in a given implementation.

The algorithm of the PBM server 200 may analyze the historical required bandwidth data (e.g., column 2 of Table A-1) to identify helpful periodicities or other features in the data, as previously described. Seasonal variations in bandwidth demand may be revealed from the analysis and used to advantage to accurately predict bandwidth. For example, summer viewing patterns may be quite different from winter viewing patterns; required bandwidth data input to the prediction algorithm may be changed on a seasonal basis. As another example, analysis of historical data may reveal that required bandwidth for a given Thursday evening may be more accurately predicted by employing required bandwidth data from an equivalent Thursday one year ago, where, the equivalent Thursday may be the closest Thursday in the previous year to the same day of the month in the current year. Myriad other scenarios will be recognized by those of ordinary skill.

In step 336, the PBM server determines the daily variability in service demand by querying the previously calculated historical database. The PBM server may also optionally maintain a tracking table of variability (third column of Table A-1) with respect to the preliminary bandwidth allocation tables on a short but configurable time interval, for example, 5 seconds. For instance, a variability of −7.5 Mb/s for 8:00:10 PM is found by subtracting the required bandwidth (second column of Table A-1) for 8:00:05 PM from the required bandwidth for 8:00:10 PM. Note that in this example, the required bandwidths shown in Table A-1 represent a consolidation of historical data; they are rounded as described above. Additionally, although steps 334 and 336 of the method of FIG. 3a describe "daily" tables, any convenient interval (e.g., hourly, weekly, monthly, etc.) may be used. The interval chosen may also depend upon overall system resource allocation or business rules policies. It may also vary as a function of time and/or operational conditions.

In step 338, the PBM server 200 builds a bandwidth requirement table such as Table A-1. To calculate a bandwidth requirement entry for each time period, the PBM server uses values of the required bandwidth (based on inter alia historical data) and variability (also based on historical data). The PBM server may select a predetermined time interval of convenience (e.g., 5 minutes) for each entry in the table, or this interval may be dynamically selected (e.g., so as to vary the granularity of the analysis as a function of operational or other conditions, such as time of day).

In the illustrated example, the PBM server takes the average of the required bandwidth over a 5 minute interval, for example, the interval between 8:00:00 PM and 8:05:00 PM (first column of Table A-1). This average in the example of Table A-1 is 196.41 Mb/s. Note that the required bandwidths shown in Table A-1 are rounded for illustration, so that their average is different from 196.41 Mb/s. The PBM server then forms the difference between the maximum required bandwidth for the 5 minute interval (213.75 Mb/s, as shown in the second column of Table A-1) and the average, i.e., 213.75 Mb/s−196.41 Mb/s=17.37 Mb/s. To calculate the predictive bandwidth for a given time (fourth column of Table A-1), the PBM server then adds this difference (17.37 Mb/s in this example) to the required bandwidth for the immediately preceding time, and adds or subtracts the variability to calculate the predictive bandwidth. For example, to obtain the predictive bandwidth for 8:05:00 PM, the PBM server adds the difference to the required bandwidth for 8:04:55 PM, and then adds the variability for 8:05:00 PM to calculate the predictive bandwidth for 8:05:00 PM, i.e., 176.25 Mb/s+17.37 Mb/s+3.75 Mb/s=197.37 Mb/s, rounded to 198.75 Mb/s.

Note that the above calculations are for illustrative purpose only, and the bandwidth entries in Table A-1 have been rounded to the nearest increment of 3.75 Mb/s. The PBM server may also retain any arbitrary number of digits of precision in making the predictive bandwidth calculations.

Moreover, while the predictive bandwidth of the above example is calculated and tabulated for 5 second intervals, and required bandwidth is averaged over a 5 minute interval, these intervals are merely illustrative, and any other convenient intervals may be used. For example, predictive bandwidth may be tabulated at or averaged over greater intervals if it is determined that the bandwidth requirements associated with a particular service group do not change very frequently.

Figure 5:
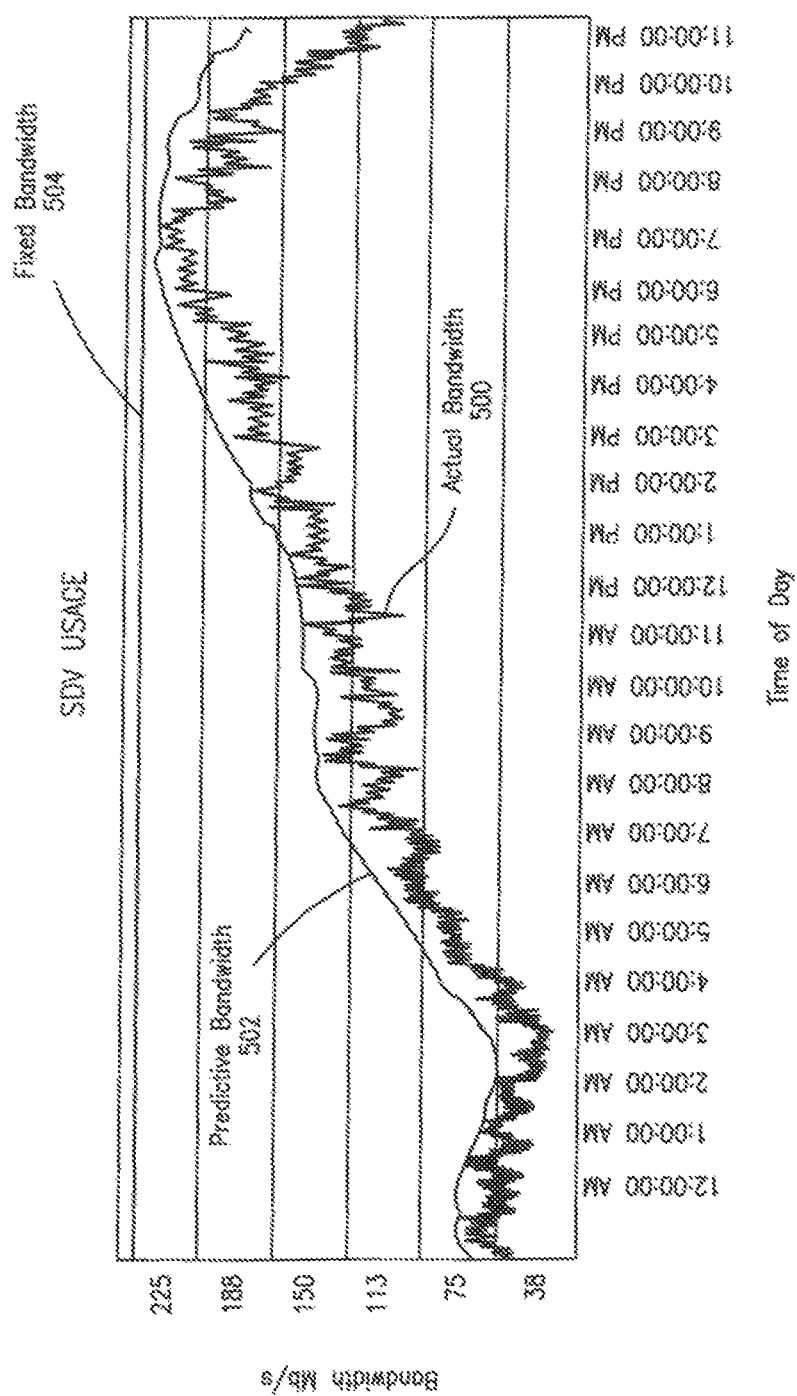
FIG. 5 is an X-Y graph showing exemplary predictive bandwidth and actual bandwidth utilization on Y axis as a function of time of the day on X-axis.

FIG. 5 shows an example plot of predictive bandwidth vs. bandwidth actually occupied by services ("Actual Bandwidth" 500 in FIG. 5) over the course of one typical day for an exemplary BSA architecture (see FIG. 1c). Also shown in FIG. 5 is the maximum bandwidth available to the service group ("Fixed Bandwidth" 504 in FIG. 5). This is the absolute upper bandwidth capacity or limit for all services provided to the service group, by e.g., pool of QAM modulators.

Table A-1 previously described illustrates an embodiment where the predictive bandwidth is always greater than or equal to, and frequently significantly greater than, the actual required bandwidth. This behavior will depend on the specific bandwidth prediction algorithm employed. In the example of Table A-1, the algorithm chosen to predict bandwidth requirements is based on a tradeoff between excess bandwidth capacity and the possibility of actual bandwidth requirements exceeding available bandwidth. This exemplary bandwidth prediction algorithm is selected so as to assure a low probability that the actual bandwidth requirements will exceed the predicted bandwidth; this provides a low probability that services will have to be blocked from joining the service group or reduced in bitrate (and possibly, in quality) before joining the service group. However, it will be appreciated that the predicted bandwidth may in one embodiment be "set aside" by the PBM server, and so may not be available for predictive allocation to "extra services". Extra services may comprise, for example, non-time critical services such as file downloads, or other services such as high speed data, and possibly including digital telephony, which may be tolerant of some level of packet delay and/or loss.

The bandwidth prediction algorithm implemented at a PBM server 200 may also be configured to provide a greater capacity for supporting extra services that can be supported opportunistically. These services can be supported by using the extra ("wasted") capacity represented by the difference between the fixed bandwidth and the predicted bandwidth at the risk of a somewhat higher probability that "guaranteed" services such as entertainment video streams may be blocked or reduced in bitrate. For example, in the plot of FIG. 5, there is a large difference (at least 6 SD programs worth) between the predictive bandwidth and the actually delivered bandwidth at 5:00 AM. However, this capacity may be set aside and therefore not available for extra services. The network operator can configure the PBM server to implement the prediction algorithm so that the difference between the predictive bandwidth and actual bandwidth is usually less than that shown in FIG. 5. This will result in less bandwidth being set aside for the service group. Conversely, more bandwidth will be freed-up for extra services. For example, the smooth shape of the predictive bandwidth curve in FIG. 5 may indicate that significant averaging is employed in the bandwidth prediction algorithm; the averaging interval may be reduced to cause the predictive bandwidth to more closely track the actual bandwidth.

The predictive bandwidth algorithm may also compare the daily bandwidth requirements of all the services and optimize the service in a manner among each other for most effective use of the combined total bandwidth, for example, as described in the co-owned U.S. patent application Ser. No. 11/243,720, entitled "SELF-MONITORING AND OPTIMIZING NETWORK APPARATUS AND METHODS", that issued as U.S. Pat. No. 8,582,584 on Nov. 12, 2013, and incorporated by reference herein in its entirety.

Returning to FIG. 3*a*, in step 340, the PBM server conveys the bandwidth allocation information to the downstream traffic generator 202 in e.g., a just-in-time (JIT) manner. Step 342 shows that the downstream traffic generator generates and delivers services created using this bandwidth allocation information.

In steps 344 and 346, the predictive algorithm parameters are optionally adjusted based upon a comparison between the predictive bandwidth and the actually delivered bandwidth. In task 314, the PBM server monitors the actual bandwidth used to deliver services and compares it to the predictive bandwidth predetermined table (Table A-1). The historical database may be updated (not shown explicitly) based upon this comparison. The method may also be configured to flag deviations between the predicted bandwidth and actually required bandwidth on, for example, a regular basis (e.g., once per hour), and feed his deviation back to the processes of steps 334 and 336 to alter the predetermined parameter table (Table A-1) to better fit the current trend.

The PBM server may also use more recent historical data for predicting required bandwidth. For example, the server may use the last X minutes (where X is any useful number of minutes, e.g., 6 hours) of historical data from when the deviation last exceeded a programmable threshold in order to make predictions; the server thus uses a moving average of the historical data for the last X minutes.

As another example, in the example of FIG. 5, there is a relatively large gap between the predictive bandwidth and the actual bandwidth. Furthermore, this gap is more pronounced at some times of the day, for example, between 5:00 AM and 6:00 AM. In step 346, the prediction algorithm averaging or other parameters may be adjusted to alter (e.g., decrease) this gap. In one embodiment, the prediction algorithm parameters may be changed during different parts of the day; for example, in the context of FIG. 5, less averaging may be used between 5:00 AM and 6:00 AM, and more between 2:00 PM and 4:00 PM, to provide more margin between predicted bandwidth and actually required bandwidth between 2:00 PM and 4:00 PM.

As another example, if the trend indicates a significant divergence of the actually delivered bandwidth from the predicted bandwidth requirement, the PBM server 200 may search for a better historical match to the current actual bandwidth requirement trend. For example, it is possible that some form of unexpected event, such as frequent "breaking news" interruptions of the normally most-popular programs, has created an exodus of some viewers to uninterrupted programming. It may then be necessary to search for historical required bandwidth data for the equivalent situation, e.g., closest day and time required bandwidth data when similar popular programs were interrupted by breaking news alerts in the past, and provide this required bandwidth data as input to the prediction algorithm, instead of the "normally expected" historical required bandwidth data for this date and time.

Yet other examples of predictive management models are described in co-pending and co-assigned application Ser. No. 11/243,720, entitled "Self-monitoring and Optimizing Network Apparatus and Methods" previously incorporated herein, and subsequently herein.

Other Analytical Frameworks—

In addition to the foregoing, any number of different analytical models and techniques can be applied to the predictive management architecture of the invention (FIG. 2) and the generalized methodology (FIG. 3) previously described.

As noted above, exemplary embodiments of the PBM server 200 may be adapted to analyze data from the historical database to identify trends, features or artifacts that can be useful in establishing or adjusting operational parameters of the network, and/or the predictive model itself. For example, the PBM server 200 may identify trends in bandwidth utilization (e.g., a jump in demand when the "prime time" viewing period starts). This trend identification may be accomplished by any number of techniques e.g., through direct parametric measurement, indirect measurement or analysis of another parameter, identification of an artifact or feature coupled with extrapolation, and so forth.

A direct parametric measurement might comprise an actual continuous or periodic determination of bandwidth utilization by subscribers within all or a portion of the network as a function of time. Example operational parameters of the network useful in this determination include the instantaneous bandwidth granted to each program in a program multiplex created for downstream distribution. The PBM can determine these operational parameters as exact values or as differences (e.g., increase or decrease in bandwidth utilization from one interval to next), and can then in turn use them to decide how much bandwidth to allocate to a group of programs in the network.

The determination of operational parameters (e.g., instantaneous bandwidth) may also be correlated to another period or event (e.g., the start of prime time), which allows for correlation to other comparable periods or events in the historical database if desired. For example, the predictive algorithm of the present invention might select data only from periods at or proximate to the start of prime time for each of the last n days, or prime time for the last n Thanksgiving Days, this data ostensibly being more relevant than that of other time periods or days.

Figure 6:
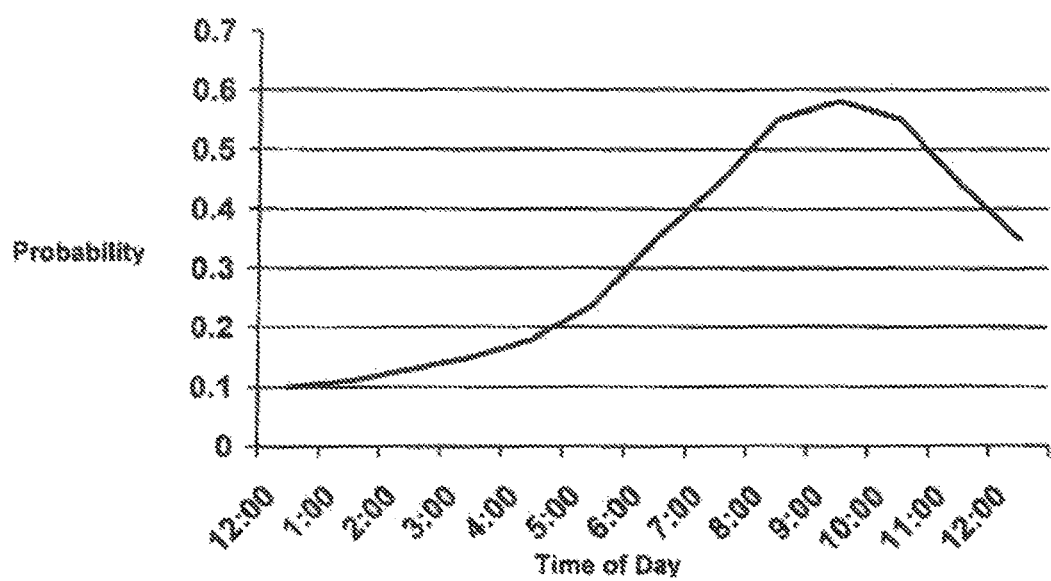
FIG. 6 is a graph illustrating an exemplary probability distribution for encountering peak or maximum bandwidth consumption according to one embodiment of the invention.

It will be appreciated that probability or statistical models or distributions can also be built on this data, such as the exemplary "prime time" start distribution shown in FIG. 6. As shown in this Figure, the probability of encountering peak or maximum bandwidth consumption is roughly normally (Gaussian) distributed, and is highest at approximately 9:00 pm on any given day; i.e., for most days, maximum demand occurs at about 9:00 pm, and at other times at less frequency. Other statistical or shape parameters (e.g., 1/e or 3σ points, etc.) may also be derived or utilized for the relevant data in order to help characterize the historical behavior further.

Note that the exemplary distribution of FIG. 6 is different than an actual or predicted bandwidth consumption over time (e.g., FIG. 5 discussed above); rather, FIG. 6 is a probability distribution of the occurrence of a certain event (e.g., peak or maximum). This can be useful in, among other things, predictively accounting for events such as spikes or transients in behavior, since a moving average or even instantaneous sampling model would necessarily be latent, and not predictive. As a simple illustration, consider the case where historical data shows the probability of a rapid surge or increase in demand to occur sometimes at a certain time of day (corresponding for example to somewhat unpredictable events, such as weather), but not all or even most days. Only certain days exhibit the behavior. The peak of such probability distribution may occur for example at 6:00 pm. Accordingly, one embodiment of the present invention might evaluate this and other similar distributions in advance, and "pad" the prediction model to at least partly account for this event should it occur. Depending on the rapidity with which the transient occurs, the MSO might otherwise be "caught short" on available bandwidth, especially under conditions of extant high demand (e.g., where the MSO has low remaining margin to begin with), but for having additional margin built into the prediction based on historical probability analysis.

The present invention also contemplates the logical coupling of two or more events or artifacts, such as when shifted in time from one another. For example, in one embodiment, the PBM server algorithm is adapted to perform "pattern recognition" of sorts (see discussion of templates and artifact detection provided elsewhere herein) so as to identify precursors of other subsequent events where possible. Such precursors might include bumps or knees in the demand curve, inflection points, maxima or minima, migration of demand from one portion of the network to another (e.g., edge to core or vice versa, one geographic area to another, etc.), increases in related parameters such as channel switching activity, and so forth. This information can be used to inter alia speculate on the existence or likelihood of future events. In one variant, a probability distribution is generated based on historical data to indicate the likelihood of the second or coupled event occurring based on observation of the first event (e.g., the second event was observed 65% of the time the first event was observed, and the second event was observed with a peak or maximum incidence at 2.7 hours after the first event was observed). This probability can also be factored into the predictive management algorithm, in a number of different ways. For example, in the prior example, the PBM server might speculate that, upon detecting the first event, it will increase its demand prediction by some amount or percentage (correlating to the second event) for a period of Z minutes before and/or after a time 2.7 hours subsequent to the first event. In this fashion, the algorithm pads the prediction at the time coordinates where the second event is most likely to occur (if it does at all). Probability says that the second event will occur 65% of the time that the first event is observed, and that it is most likely to occur at or about 2.7 hours subsequent to the first event, so it is a reasonably good practice (i.e., will pay off more times than not) to accommodate the prospective second event by adjusting the prediction in anticipation thereof.

The prediction algorithm might also dynamically update its allocation periodically, including updating the probability of an event (e.g., peak bandwidth consumption) associated with that particular time. The exemplary relationship of Eqn. (1) may be used for this purpose; this relationship is used to relate a probability function P(t) to a relevant peak or maximum bandwidth observed historically (e.g., for prime time periods, or whatever the relevant period of interest is):

$$B_{pc}(t) = P(t) \times B_{max} \qquad \text{Eqn. (1)}$$

Where:
  $B_{pc}(t)$=Predicted bandwidth consumption component as a function of time
  $P(t)$=Probability as a function of time (from, e.g., FIG. 6)
  $B_{max}$=Maximum or peak historical bandwidth consumption relevant to that time period It will be appreciated that the peak or maximum bandwidth value used in Eqn. (1) need not be static, but may also be varied as a function of time or another parameter. For example, in one variant, $B_{max}$ comprises a X-day moving average of peak bandwidths observed during the relevant period (e.g., prime-time). In this fashion, a relevant value for maximum bandwidth, which may vary as a function of the hour, day, month or year, will be used to generate the predicted bandwidth component of Eqn. (1).

The predicted component of Eqn. (1) may then be used alone or as part of a larger prediction algorithm, such as where the component relates to only a portion of the total bandwidth consumption. For example, in one embodiment, the total predicted downstream bandwidth ($B_p(t)$) may be the aggregate sum (or product) of multiple components, such as for VOD, DOCSIS (OOB), BSA (broadcast), and so forth, which each may vary differently as a function of time or other parameters (and which can be weighted), as shown in Eqn. (2).

$$B_p(t)=C_1 \times B_{pcV}(t)+C_2 \times B_{pcB}(t)+C_3 \times B_{pcD}(t)+ \quad \text{Eqn. (2)}$$

Where:
- $B_p(t)$=Predicted bandwidth consumption (total) as a function of time
- $B_{pV}(t)$=Predicted bandwidth consumption component (VOD) as a function of time
- $B_{pB}(t)$=Predicted bandwidth consumption component (BSA) as a function of time
- $B_{pD}(t)$=Predicted bandwidth consumption component (DOCSIS) as a function of time
- $C_1, C_2, C_3 \ldots$ =Weighting coefficients Moreover, the aforementioned bandwidth predictions may be aggregated or separated based on other factors such as geographic or relative location within the network. For instance, BSA bandwidth might originate more from the edges of the network, whereas VOD bandwidth would originate from the core portion. This differentiation might be useful for the network operator (or any prediction or allocation algorithms), in effect allowing sub-predictions for different portions of the network.

The present invention also contemplates the characterization of demand as to type or requirements. For example, a non-time sensitive or latent download (such as a delayed, high speed (or bursted), or "trickle" download) can be identified to the PBM process, as differentiated from an instantaneous or real-time (streaming) demand. Exemplary high-speed content download apparatus and methods are described in co-owned U.S. patent application Ser. No. 11/013,665 filed Dec. 15, 2004 and entitled "METHOD AND APPARATUS FOR HIGH BANDWIDTH DATA TRANSMISSION IN CONTENT-BASED NETWORKS", that issued as U.S. Pat. No. 8,522,293 on Aug. 27, 2013, incorporated herein by reference in its entirety. As an illustration, consider the case where a trickle or high-speed download is requested; as these may be delivered with some latency, and not in real-time (i.e., no continuity of the download need be maintained), the PBM can treat this request differently in terms of modification of its predicted bandwidth consumption at a given time than it would an instantaneous or real-time request. Hence, the PBM can (i) adjust its predictive model to account for this known but latent demand for bandwidth (since it knows for sure that it will deliver this bandwidth at some time in the future), and even (ii) if permissible, selectively schedule or "move around" the bandwidth required to service the trickle or latent download to an advantageous or optimized time. In terms of adjustment of the predictive model, one embodiment of the invention applies a template to the trickle download so as to profile the bandwidth consumption for such downloads as a function of time (e.g., as a low-bitrate constant transmission, as a periodic or bursted download, or any number of other possible profiles for non-real time streaming content). For example, when the PBM receives a request for a trickle download, it can model the download as a subsequent constant low-bitrate download, which may approximate the actual trickle download event. Or, it may model a high-speed download as one or a series of non-contiguous burst events.

In another embodiment, a fully opportunistic download approach is used (see, e.g., co-owned U.S. patent application Ser. No. 11/706,620 filed Feb. 14, 2007 and entitled "METHODS AND APPARATUS FOR CONTENT DELIVERY NOTIFICATION AND MANAGEMENT", that issued as U.S. Pat. No. 9,270,944 on Feb. 23, 2016, incorporated herein by reference in its entirety), thereby obviating the need to modify the predictive model. Specifically, since the aforementioned technique is opportunistic, and utilizes actual bandwidth only when it is available and otherwise "wasted", it will by definition not require consideration within the predictive model. The PBM will, as described elsewhere herein, constantly be attempting to eliminate at least some of this wasted bandwidth, but it will never be completely effective, and accordingly there will always be some unused bandwidth. Hence, in this embodiment, when trickle or high-speed content requests are received that will be serviced opportunistically, the PBM need not consider them or adjust the predictive model.

However, when the PBM knows that an appreciable number of trickle downloads are predicted or requested, it can pad the prediction somewhat to accommodate these opportunistic deliveries, since the bandwidth to service them must come from somewhere (and may be detracting from safety margin; e.g., that reserved for new streaming requests, due to unanticipated operational conditions, etc.). Stated differently, if the predictive model is too accurate or closely tailored to actual demand, then there is very little "wasted" bandwidth at any given time, and servicing of many of these opportunistic requests will be overly latent unless some pad is built into the predictive model. This can be selectively controlled if desired, such as during periods of high VOD or other demand or limited remaining network capacity, wherein the VOD requests would be preferentially serviced using the "pad" (or reserve margin maintained), and the opportunistic requests merely pushed back to a later time.

The foregoing approach may also be anecdotal (versus probabilistic) in nature. For example, if last Thanksgiving Day, a demand spike of a large magnitude occurred, but this spike was not reflected in other years, this most recent data can be used as the basis for a speculative or anticipatory assignment of bandwidth this Thanksgiving Day in the event that the same phenomenon occurs again. Statistics need not be developed before such information can be used within the predictive algorithm.

In contrast to the foregoing direct measurement techniques, an indirect measurement or analysis might comprise e.g., the number of channel switching events per unit time (which could be related to the level of viewership at a given time), powering up of STBs, DVR activity, or the like, thereby indirectly indicating that viewership is increasing (and hence bandwidth utilization, by inference). This type of scheme can be useful where no (readily available) source of actual bandwidth consumption or demand is available, such as within certain portions of the network that do not have such capacity, or at times when direct measurement of instantaneous bandwidth consumption is not feasible (e.g., component failure, maintenance, etc.).

Artifact detection might comprise, for example, detection of an initial spike or other feature (e.g., inflection point, maximum/minimum, ratio of parameters exceeding or falling below a prescribed value, etc.) in utilization, followed by a historically-based or other extrapolation or prediction for subsequent utilization. An MSO might be able to reliably speculate, for example, that for a period X hours after the identification of a prime-time spike, utilization will remain comparatively high, or follow some predetermined behavior or pattern (e.g., monotonically ramping downward, exponential decay, etc.). To this end, the present invention also contemplates the use of static or even dynamic templates for capacity utilization prediction or speculation. Much as natural phenomenon or organisms will tend to exhibit repeated and generally common patterns of behavior, so often may viewers within a content-based network. For example, a large number of viewers might exhibit a common pattern each Thanksgiving Day (e.g., switching to certain channels carrying football games) at certain times.

Hence, under the present invention, the MSO might establish a series of templates for various operational conditions or circumstances, and use these templates as the basis for prediction and allocation as opposed to having to constantly gather real-time information. Matching of observed patters to existing templates can be accomplished algorithmically, such as via curve fitting, or recognition of one or more features or events. Alternatively, the templates can be selected in advance or on-the-fly based on time, day of the week, for holidays, special or sui generis events (e.g., aliens visiting Earth for the first time), etc. Confidence or "adherence" levels may also be ascribed to these templates; such as where real-time data is periodically gathered and compared to the template in order to assess how well the template is "tracking" reality. The templates may be dynamically replaced or altered as well, such as based on an observed divergence between the template and actual usage patterns, and/or a better correlation to another template.

It will also be recognized that the predictive techniques of the present invention can be applied in varying levels of granularity, ranging anything from the entire network (or portions thereof), through the service group level, and down to even the individual subscriber level. For example, historical tuning data for a plurality of subscribers within a service group can be amassed as a whole (i.e., irrespective of associating specific historical data with specific subscribers), and used as the basis of prediction for inter alms that service group (or portions thereof). Alternatively, the same data can be gathered, but on an individual subscriber basis, such as via TUNER USE, MAC, TUNER ID, an "opaque" variable, or other such variables associated with each subscriber's CPE 106. See, e.g., the exemplary methods and apparatus of co-owned U.S. patent application Ser. No. 11/186,452 filed Jul. 20, 2005 and entitled "METHOD AND APPARATUS FOR BOUNDARY-BASED NETWORK OPERATION", incorporated herein by reference in its entirety. In one such approach, anonymous CPE or subscriber identification (e.g., via a one-way cryptographic hash and TUNER USE, TUNER ID, and opaque variables) can be used consistent with embodiments of the present invention to allow for per-subscriber historical data association and storage even while enforcing complete anonymity. Other data such as channel changes, VOD requests, in-band and OOB communications, etc. and the like can be stored under this method as well in order to provide the desired level of information on a subscriber's historical usage patterns.

Network Server—

Figure 7:
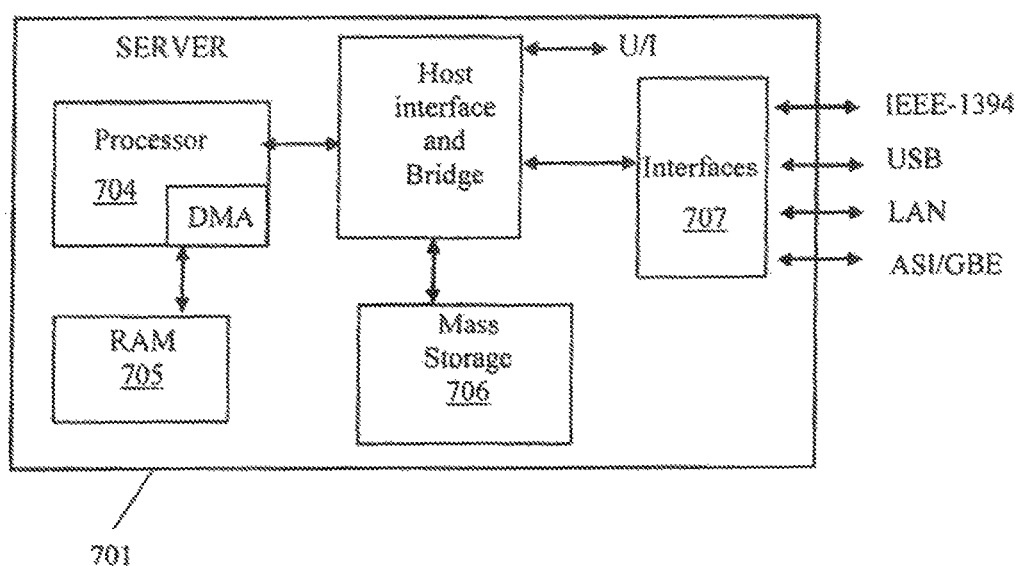
FIG. 7 is a block diagram illustrating one embodiment of a network server device according to the present invention.

Referring now to FIG. 7, one embodiment of the improved network server device with predictive capacity management and optimization capability according to the present invention is described. This device might comprise, for example, the PBM server 200 of FIG. 2, or yet another server within the network. For example, the device 701 may comprise an OCAP (OpenCable) compliant BSA network server module 196 adapted for use at the hub site of FIG. 1c, or other types of devices (e.g., VOD or application servers) within the network as previously described.

The server 701 comprises a digital processor(s) 704, storage device 706, and a plurality of interfaces 707 for use with other network apparatus such as QAM combiners, IP routers and other packet network devices, network management and provisioning systems, local PCs, etc. Other components which may be utilized within the server device 701 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required, such as in support of data and "rules" interchange between the server 701 and the CPE 106. The PBM server process is also disposed to run on the server module 701 to provide a functional interface with the historical database 206, downstream generator 202, ingestion or ingress entity 204 (see FIG. 2), or other network entities or processes such as the business rules engine described subsequently herein. These components and functionalities are well known to those of ordinary skill in the cable and embedded system fields, and accordingly not described further herein.

The server device 701 of FIG. 7 may take any number of physical forms, comprising for example one of a plurality of discrete modules or cards within a larger network headend, edge or hub device of the type well known in the art. The server may also comprise firmware, either alone or in combination with other hardware/software components such as those previously described (e.g., disposed in the aforementioned headend or edge device). Alternatively, the server module 701 may be a stand-alone device disposed at the headend, hub or other site, and may even include its own RF front end (e.g., modulators, multiplexers, encryptors, etc.) or optical interface so as to interface directly with various portions of the HFC network 101. Numerous other configurations may be used. The server device 701 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the data analysis, prediction and control parameter generation functionality described above may take the form of one or more computer programs (e.g., server and client processes). Alternatively, such computer programs may have one or more components distributed across various hardware environments at the same or different locations, such as where the server process is distributed across multiple platforms at the hub site and the headend 150.

As yet another example, portions of the functionality may be rendered as a dedicated or application specific IC having code running thereon. Myriad different configurations for practicing the invention will be recognized by those of ordinary skill in the network arts provided the present disclosure.

Operations/Business Rules Engine—

In another aspect of the invention, the aforementioned PBM server process (e.g., rendered as one or more computer programs) optionally includes a business/operations rules engine. This engine comprises, in an exemplary embodiment, a series of software routines running on the server device 701 or other associated hardware/firmware environment adapted to control the operation of the predictive management and optimization algorithms previously described. These rules may also be fully integrated within the PBM server process itself, and controlled via e.g., a GUI on a PC connected to the server 701, or even remotely or automatically. In effect, the business rules engine comprises a supervisory entity which monitors and selectively controls, via the PBM server process functions at a higher level, so as to implement desired operational or business rules. The rules engine can be considered an overlay of sorts to the algorithms of the PBM server process previously described. For example, the server process may invoke certain operational protocols or decision processes based on data received from the historical database 206, as well as network operational data, demographic data, geographic data, etc. However, these processes may not always be compatible with higher-level business or operational goals, such as maximizing profit or system reliability. Hence, when imposed, the business/operational rules can be used to dynamically (or manually) control the operation of the PBM server process, in conjunction with the operational "recommendations" generated by the server process as part of its predictive management and control functions previously described.

For example, one rule implemented by the rules engine may comprise selectively rescheduling latent (e.g., non-time sensitive, or trickle) deliveries for a time when predicted demand does not closely approximate network capacity (e.g., identifying such conditions in real time, and then commencing the delivery), thereby providing all available capacity for servicing real-time demands (and hence prospectively avoiding degradation of subscriber satisfaction). Similarly, when such deliveries may be scheduled for periods when the predicted demand is significantly higher than actual (e.g., instantaneous bandwidth), thereby increasing the availability of "wasted" bandwidth that can be used by opportunistic modes.

Another business or operations rule might call for changes in the averaging or historical period under evaluation (e.g., granularity of analysis) so as to more closely tailor the predicted demand with the actual demand. As previously described, the correlation between prediction and actual will be determined at least in part by the periodicity or frequency with which the historical or predictive analysis is performed. Hence, the rules engine may dynamically alter this frequency (and/or the source data used, etc.) so as to "squeeze" as much capacity out of the prediction as possible. For example, if the prediction algorithms are run less frequently, there may be significant gaps between predicted and actual demand. Since the bandwidth allocation mechanism of the exemplary embodiment obeys the predictive model (i.e., allocates bandwidth based at least in part on the prediction), appreciable wasted bandwidth will exist, which could be used to service additional requests from users. Hence, as the network approaches its "predictive" capacity limit, the PBM operation and parameters (e.g., frequency) can be adjusted so as to have predicted and actual demand correlate more closely.

Similarly, one rule might comprise varying the amount of reserved or "held back" capacity (i.e., that not subject to the predictive allocation algorithms) so as to optimize one or more parameters.

Many other approaches and combinations are envisaged consistent with the invention, as will be recognized by those of ordinary skill when provided this disclosure. An example is the application of business rules in cases of arbitration of edge QAM resource allocation between contending services such as BSA and VOD. Another example is the prioritization or assignment of a "grade of service" to a specific program supplier (e.g. The Golf Channel) for a fee. A non-blocking grade of service can thus be assigned to the programmer wherein any CPE request for that programmer is honored at the expense of removal of a lower priority programmer based on business rules. Enforcement of such business rules may be executed by servers separately for each service (e.g. BSA or VOD) or centrally via the controlling actions of a master SRM (Session and Resource Manager) or other agent.

Business Methods—

As mentioned above, effective capacity prediction may provide a greater ability to support extra services, e.g., using the extra capacity represented by the difference between the fixed bandwidth and the predicted bandwidth to support more content delivery requests. Various business models may be supported by such effective capacity prediction. For example, one such model may comprise using the extra capacity to promote the programs and/or services available to subscribers. To enhance utilization of this spare capacity, a special price or other incentives may be offered to encourage viewers to request movies or other content that can be serviced using the spare capacity of the system alone. Movies may, for example, be downloaded to subscribers' digital video recorder (DVR) devices at slower than real-time streaming rates (e.g., trickles), or high-speed downloads conducted in two or more bursts, compatible with the available excess capacity. The method may include network operators proactively sending content to subscribers' DVRs, based on knowledge of the subscribers' viewing or delivery preferences, using the excess or otherwise wasted capacity.

In another embodiment, extra bandwidth may be offered to Internet access subscribers at discounted rates or gratuitously, during portions of the day when extra bandwidth is available, so as to increase their satisfaction (e.g., higher download speeds). Extra bandwidth might also be selectively allocated to business-class customers (typically a high profit margin) before allocation to residential customers.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

APPENDIX A

TABLE A-1

| Time | Required Bandwidth (Mb/s) | Variability (Mb/s) | Predictive Bandwidth (Mb/s) |
|---|---|---|---|
| 8:00:00 PM | 206.25 | | 228.75 |
| 8:00:05 | 206.25 | 0.00 | 228.75 |
| 8:00:10 | 198.75 | −7.50 | 217.50 |
| 8:00:15 | 202.50 | 3.75 | 221.25 |
| 8:00:20 | 210.00 | 7.50 | 232.50 |
| 8:00:25 | 210.00 | 0.00 | 232.50 |
| 8:00:30 | 206.25 | −3.75 | 228.75 |
| 8:00:35 | 213.75 | 7.50 | 236.25 |
| 8:00:40 | 213.75 | 0.00 | 236.25 |

APPENDIX A-continued

TABLE A-1

| Time | Required Bandwidth (Mb/s) | Variability (Mb/s) | Predictive Bandwidth (Mb/s) |
|---|---|---|---|
| 8:00:45 | 213.75 | 0.00 | 236.25 |
| 8:00:50 | 213.75 | 0.00 | 236.25 |
| 8:00:55 | 210.00 | −3.75 | 232.50 |
| 8:01:00 | 206.25 | −3.75 | 228.75 |
| 8:01:05 | 210.00 | 3.75 | 232.50 |
| 8:01:10 | 198.75 | −11.25 | 217.50 |
| 8:01:15 | 206.25 | 7.50 | 228.75 |
| 8:01:20 | 198.75 | −7.50 | 217.50 |
| 8:01:25 | 198.75 | 0.00 | 217.50 |
| 8:01:30 | 206.25 | 7.50 | 228.75 |
| 8:01:35 | 210.00 | 3.75 | 232.50 |
| 8:01:40 | 206.25 | −3.75 | 228.75 |
| 8:01:45 | 206.25 | 0.00 | 228.75 |
| 8:01:50 | 195.00 | −11.25 | 213.75 |
| 8:01:55 | 198.75 | 3.75 | 217.50 |
| 8:02:00 | 191.25 | −7.50 | 210.00 |
| 8:02:05 | 198.75 | 7.50 | 217.50 |
| 8:02:10 | 198.75 | 0.00 | 217.50 |
| 8:02:15 | 198.75 | 0.00 | 217.50 |
| 8:02:20 | 195.00 | −3.75 | 213.75 |
| 8:02:25 | 202.50 | 7.50 | 221.25 |
| 8:02:30 | 206.25 | 3.75 | 228.75 |
| 8:02:35 | 206.25 | 0.00 | 228.75 |
| 8:02:40 | 198.75 | −7.50 | 217.50 |
| 8:02:45 | 202.50 | 3.75 | 221.25 |
| 8:02:50 | 191.25 | −11.25 | 210.00 |
| 8:02:55 | 187.50 | −3.75 | 206.25 |
| 8:03:00 | 191.25 | 3.75 | 210.00 |
| 8:03:05 | 195.00 | 3.75 | 213.75 |
| 8:03:10 | 198.75 | 3.75 | 217.50 |
| 8:03:15 | 191.25 | −7.50 | 210.00 |
| 8:03:20 | 183.75 | −7.50 | 202.50 |
| 8:03:25 | 187.50 | 3.75 | 206.25 |
| 8:03:30 | 195.00 | 7.50 | 213.75 |
| 8:03:35 | 187.50 | −7.50 | 206.25 |
| 8:03:40 | 187.50 | 0.00 | 206.25 |
| 8:03:45 | 187.50 | 0.00 | 206.25 |
| 8:03:50 | 180.00 | −7.50 | 198.75 |
| 8:03:55 | 191.25 | 11.25 | 210.00 |
| 8:04:00 | 183.75 | −7.50 | 202.50 |
| 8:04:05 | 191.25 | 7.50 | 210.00 |
| 8:04:10 | 187.50 | −3.75 | 206.25 |
| 8:04:15 | 180.00 | −7.50 | 198.75 |
| 8:04:20 | 187.50 | 7.50 | 206.25 |
| 8:04:25 | 183.75 | −3.75 | 202.50 |
| 8:04:30 | 187.50 | 3.75 | 206.25 |
| 8:04:35 | 183.75 | −3.75 | 202.50 |
| 8:04:40 | 180.00 | −3.75 | 198.75 |
| 8:04:45 | 183.75 | 3.75 | 202.50 |
| 8:04:50 | 176.25 | −7.50 | 195.00 |
| 8:04:55 | 176.25 | 0.00 | 195.00 |
| 8:05:00 PM | 180.00 | 3.75 | 198.75 |

What is claimed is:

1. A computerized method of operating a network that distributes digitally rendered content from different portions of the network, the computerized method comprising:
generating data relating to a first projection of capacity requirements for distributing digitally rendered content from a first portion of the different portions of the network, the first projection based at least partly on data related to historical capacity utilization at the first portion of the network;
allocating capacity within the network to distribute the digitally rendered content through the first portion, wherein the allocation is based at least partly on the data relating to the first projection and does not include allocation of capacity to a second portion of the network; and
wherein the first portion is at a different location within a topology of the network than the second portion of the network.

2. The method of claim 1, wherein each of the different portions of the network provides a different service comprising at least one of: broadcast switched service, a high-speed data service, and video on demand service.

3. The method of claim 1, wherein the data related to the historical capacity utilization at the first portion of the network comprises data representative of a service type.

4. The method of claim 1, wherein the data related to the historical capacity utilization at the first portion of the network comprises data representative of actual bandwidth demand for the digitally rendered content provided by the first portion of the network over a period of time.

5. The method of claim 1, wherein the generating the data relating to the first projection of capacity requirements comprises generating data that relates to a portion of a total bandwidth consumed by the different portions of the network.

6. The method of claim 1, further comprising:
generating data relating to a second projection of capacity requirements for distributing the digitally rendered content through a second portion of the different portions of the network based at least partly on data related to historical capacity utilization at the second portion of the network; and
allocating capacity within the network to distribute the digitally rendered content through the second portion based at least partly on the data relating to the second projection.

7. The method of claim 6, wherein the allocating capacity within the network to distribute the digitally rendered content through the first portion and the allocating capacity within the network to distribute the digitally rendered content through the second portion comprise:
assigning a first weight to the first projection and a second weight to the second projection; and
aggregating the first weight and the second weight.

8. The method of claim 6, wherein the allocating capacity within the network to distribute the digitally rendered content through the first portion and the allocating capacity within the network to distribute the digitally rendered content through the second portion comprise:
allocating unused bandwidth for digitally rendered content to the first portion from the second portion based on the second projection indicating the unused bandwidth by the second portion.

9. A computerized method of operating a content distribution network, the computerized method comprising:
keeping first data of subscriber requests for a first portion of the content distribution network;
keeping second data of subscriber requests for a second different portion of the content distribution network;
generating respective sub-projections for the first portion and the second different portion based on the first data of subscriber requests and the second data of subscriber requests, where each of the respective sub-projections are generated with respect to a future period of time, and wherein the first portion provides a first type of service, and the second different portion provides a second different type of service; and
allocating unused bandwidth to the first portion of the content distribution network from the second different portion of the content distribution network based on a sub-projection for the second different portion indicating the unused bandwidth within the second different portion.

10. The method of claim 9, wherein a first service and a second different service provided by the first portion and the second different portion comprises a broadcast service and video on demand service, respectively, and wherein the first portion comprises an edge switch, and the second different portion comprises a core portion of the content distribution network.

11. The method of claim 9, wherein the allocating capacity within the content distribution network to the first portion and the second different portion comprises:
assigning respective weights for each of the respective sub-projections; and
aggregating the respective weights for each of the respective sub-projections.

12. The method of claim 9, wherein the first service comprises a broadcast service and the second service comprises high-speed data service, and wherein the first portion comprises an edge switch, and the second different portion comprises a cable modem termination system (CMTS) of the content distribution network.

13. Computerized network apparatus configured to allocate bandwidth in a content delivery network characterized by a plurality of heterogeneous portions, the computerized network apparatus comprising:
server apparatus comprising:
digital processor apparatus;
network interface apparatus in data communication with the digital processor apparatus; and
storage apparatus in data communication with the digital processor apparatus, the storage apparatus comprising at least one computer program configured to, when executed on the digital processor apparatus:
generate data corresponding to a first projection of a capacity required at a future time period for distribution of digitally rendered content from a first portion of the plurality of heterogeneous portions of the content delivery network, wherein the first projection based at least partly on data related to the first portion of the content delivery network and wherein the first projection is not based on data related to a second different portion of the content delivery network; and
cause an allocation of capacity within the content delivery network to distribute the digitally rendered content from the first portion, the allocation of capacity based at least partly on the data corresponding to the first projection;
wherein the first portion and the second different portion comprise particular ones of a plurality of topologic portions of the content delivery network, and each respective capacity required by the plurality of topologic portions of the content delivery network at a future time period is different from others of the respective capacity required by the plurality of topological portions.

14. The computerized network apparatus of claim 13, wherein each of the plurality of topologic portions of the content delivery network provides a different type of service, each of the respective different types of services comprising at least one of: broadcast service, high-speed data service, and video on demand service.

15. The computerized network apparatus of claim 13, wherein the at least one computer program is further configured to, when executed on the digital processor apparatus:
cause access of at least a portion of a database, the database comprising a plurality of collected data related to historical bandwidth utilization; and
update the database with recently acquired data at least periodically, the recently acquired data comprising data relating to actual bandwidth demand within at least the first portion of the content delivery network.

16. The computerized network apparatus of claim 13, wherein the at least one computer program is further configured to, when executed on the digital processor apparatus:
generate data corresponding to a second projection of capacity requirements for a second portion of the plurality of heterogeneous portions of the content delivery network based at least partly on data related to the second portion; and
cause allocation of capacity within the content delivery network to distribute the digitally rendered content through the second portion based at least partly on the data corresponding to the second projection.

17. The computerized network apparatus of claim 16, wherein the allocation of capacity to distribute the digitally rendered content from the first portion and through the second portion comprises:
assignment of a weight to each of the first projection and the second projection; and
aggregation of the weight of the first projection and the weight of the second projection.

18. The computerized network apparatus of claim 16, wherein the allocation of capacity to distribute the digitally rendered content from the first portion and through the second portion comprises:
allocation of unused bandwidth to the first portion from the second portion based on the second projection indicating the unused bandwidth by the second portion.

19. Computerized network apparatus configured to allocate bandwidth in a content delivery network characterized by a plurality of heterogeneous portions, the computerized network apparatus comprising:
server apparatus comprising:
digital processor apparatus;
network interface apparatus in data communication with the digital processor apparatus; and
storage apparatus in data communication with the digital processor apparatus, the storage apparatus comprising at least one computer program configured to, when executed on the digital processor apparatus:
generate data corresponding to a first projection of a capacity required at a future time period for distribution of digitally rendered content from a first portion of the plurality of heterogeneous portions of the content delivery network, the first projection based at least partly on data related to the first portion of the content delivery network, the data related to the first portion comprising at least a number of channel switching events per unit time; and
cause an allocation of capacity within the content delivery network to distribute the digitally rendered content from the first portion, the allocation of capacity based at least partly on the data corresponding to the first projection;
wherein the first portion comprises a particular one of a plurality of topologic portions of the content delivery network, and a capacity required by each the plurality of topologic portions of the content delivery network respectively at a future time period is different from a capacity required by of the plurality of topological portions, respectively; and
wherein the data corresponding to the first projection correlates (i) at least one feature indicated by the data related to the first portion of the content delivery network to (ii) the future time period.

20. The computerized network apparatus of claim 19, wherein the at least one feature indicated by the data related to the first portion of the content delivery network comprises a particular time period of a particular day in a week, and the future time period comprises a same time period of a same day of a different week.

\* \* \* \* \*